(12) United States Patent
Moldvai

(10) Patent No.: US 10,423,465 B2
(45) Date of Patent: Sep. 24, 2019

(54) DISTRIBUTED SEMAPHORE WITH ADJUSTABLE CHUNK SIZES

(71) Applicant: RUBRIK, INC., Palo Alto, CA (US)

(72) Inventor: Noel Moldvai, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 42 days.

(21) Appl. No.: 15/901,390

(22) Filed: Feb. 21, 2018

(65) Prior Publication Data
US 2019/0258530 A1    Aug. 22, 2019

(51) Int. Cl.
| | |
|---|---|
| G06F 9/50 | (2006.01) |
| G06F 9/52 | (2006.01) |
| G06F 11/14 | (2006.01) |
| G06F 9/455 | (2018.01) |

(52) U.S. Cl.
CPC ............ *G06F 9/52* (2013.01); *G06F 9/45533* (2013.01); *G06F 9/5005* (2013.01); *G06F 11/1464* (2013.01); *G06F 2201/84* (2013.01)

(58) Field of Classification Search
CPC .................................................. G06F 9/5005
See application file for complete search history.

(56) References Cited

U.S. PATENT DOCUMENTS

| | | | |
|---|---|---|---|
| 2005/0198448 A1* | 9/2005 | Fevrier | G06F 9/544 711/154 |
| 2005/0237330 A1* | 10/2005 | Stauffer | G06F 9/5016 345/531 |
| 2014/0258657 A1 | 9/2014 | Schott | |
| 2015/0227586 A1 | 8/2015 | Li | |

OTHER PUBLICATIONS

PCT Communication Relating to the Results of the Partial International Search dated Jun. 13, 2019, PCT Patent Application No. PCT/US2018/067715.

\* cited by examiner

*Primary Examiner* — Charlie Sun
(74) *Attorney, Agent, or Firm* — Vierra Magen Marcus LLP

(57) ABSTRACT

Methods and systems for allocating disk space and other limited resources (e.g., network bandwidth) for a cluster of data storage nodes using distributed semaphores with atomic updates are described. The distributed semaphores may be built on top of a distributed key-value store and used to reserve disk space, global disk streams for writing data to disks, and per node network bandwidth settings. A distributed semaphore comprising two or more semaphores that are accessed with different keys may be used to reduce contention and allow a globally accessible semaphore to scale as the number of data storage nodes within the cluster increases over time. In some cases, the number of semaphores within the distributed semaphore may be dynamically adjusted over time and may be set based on the total amount of disk space within the cluster and/or the number of contention fails that have occurred to the distributed semaphore.

20 Claims, 21 Drawing Sheets

Versions of Virtual Machine A      Stored Files

| Versions of Virtual Machine A | Stored Files | |
|---|---|---|
| Version V1 / Time T1 | R4 ▯ | ⎫ |
| Version V2 / Time T2 | R3 ▭ | ⎬ Reverse incrementals |
| Version V3 / Time T3 | R2 ▭ | ⎪ |
| Version V4 / Time T4 | R1 ▯ | ⎭ |
| Version V5 / Time T5 | Base ▬▬▬▬ | } Full image |
| Version V6 / Time T6 | F1 ▯ | ⎫ Forward incrementals |
| Version V7 / Time T7 | F2 ▯ | ⎭ |

FIG. 2A

Virtual Machine A, Version V7 {
    pBase,      ⟶   /snapshots/VM_A/s5/s5.full
    pF1,      ⟶   /snapshots/VM_A/s6/s6.delta
    pF2      ⟶   /snapshots/VM_A/s7/s7.delta
}

FIG. 2B

Virtual Machine A, Version V2 {
    pBase,      ⟶   /snapshots/VM_A/s5/s5.full
    pR1,      ⟶   /snapshots/VM_A/s4/s4.delta
    pR2,      ⟶   /snapshots/VM_A/s3/s3.delta
    pR3      ⟶   /snapshots/VM_A/s2/s2.delta
}

FIG. 2C

```
Virtual Machine A, Version V7 {
    pBase2,                    ⟶    /snapshots/VM_A/s7/s7.full
}
```

```
Virtual Machine A, Version V2 {
    pBase2,                    ⟶    /snapshots/VM_A/s7/s7.full
    pR11,                      ⟶    /snapshots/VM_A/s6/s6.delta
    pR12,                      ⟶    /snapshots/VM_A/s5/s5.delta
    pR1,                       ⟶    /snapshots/VM_A/s4/s4.delta
    pR2,                       ⟶    /snapshots/VM_A/s3/s3.delta
    pR3                        ⟶    /snapshots/VM_A/s2/s2.delta
}
```

Virtual Machine B, Version V1 {
    pBase,
    pR1,
    pR2,
    pF3
}

Virtual Machine C, Version V2 {
    pBase,
    pF1,
    pF5,
    pF6
}

Virtual Machine B, Version V1 {
    pBase2,
    pR11,
    pR12,
    pR1,
    pR2,
    pF3
}

Virtual Machine C, Version V2 {
    pBase2,
    pR11,
    pF5,
    pF6
}

Virtual Machine A, Version VS {
    pBaseA,
    pR4,
}

Virtual Machine A, Version VU {
    pBaseB,
    pR1,
    pR2,
    pR3
}

Virtual Machine A, Version VU {
    pBaseA,
    pF9
}

DISTRIBUTED SEMAPHORE WITH ADJUSTABLE CHUNK SIZES

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

DETAILED DESCRIPTION

Figure 1A:
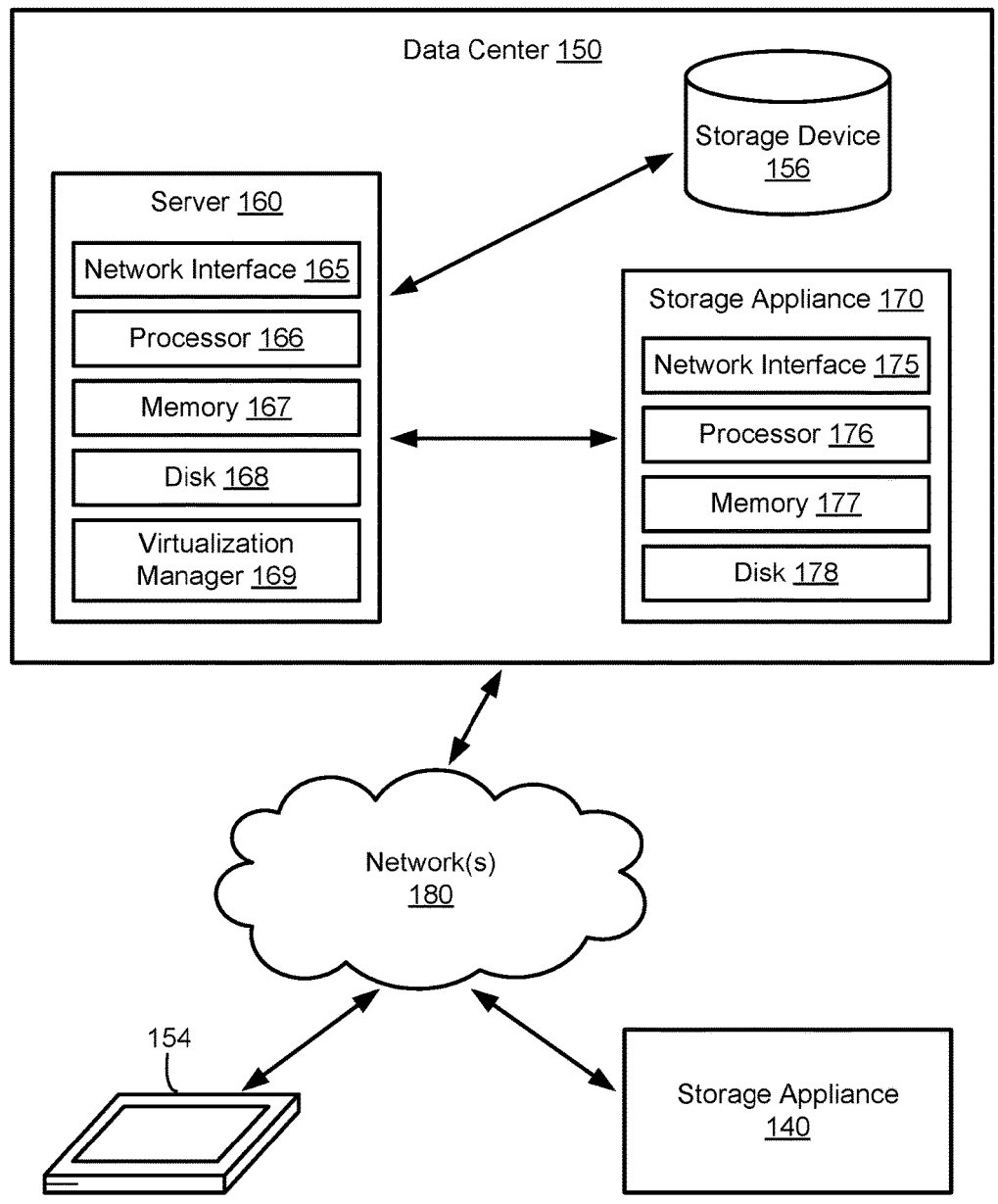
FIG. 1A depicts one embodiment of a networked computing environment.

Technology is described for allocating disk space and other limited resources (e.g., network bandwidth) for a cluster of data storage nodes using distributed semaphores with atomic updates. The distributed semaphores may be built on top of a distributed key-value store and used to reserve disk space (e.g., for a job capturing a snapshot of a virtual machine or consolidating snapshots associated with different point in time versions of the virtual machine), reserve global disk streams for writing data to disks, reserve memory (e.g., RAM), and reserve per node network bandwidth settings for data storage nodes in the cluster. One issue with using a single global semaphore with a single row that is accessed by a single key is that contention issues on the underlying key-value store may prevent efficient reservations and releases from occurring, especially when numerous jobs are vying for access to the same single row at the same time. Instead, a distributed semaphore comprising two or more semaphores that are accessed with different keys may be used to reduce contention and allow the global semaphore to scale as the number of data storage nodes within the cluster increases over time. The two or more semaphores of the distributed semaphore with different keys may together represent the entire global semaphore. In one example, the distributed semaphore may correspond with disk space reservations and may be used to reserve ten different portions of a disk space for storing electronic files associated with various jobs running within the cluster of data storage nodes. In this case, the distributed semaphore may comprise ten different semaphores, wherein each semaphore of the ten semaphores corresponds with one of the ten portions of the disk space (e.g., each portion may cover 10 TB of a 100 TB disk space).

In some embodiments, a distributed semaphore may be used to reserve disk space for a job prior to the job performing various tasks in order to prevent the job from running out of disk space half-way through performance of the various tasks. The various tasks may include consolidating two or more snapshots of a real or virtual machine, generating and storing a reverse incremental file associated with a snapshot of a real or virtual machine, or generating and storing a full-image point in time version of a real or virtual machine. When a job (or a computing process) requires an amount of disk space to be allocated, the job may attempt to reserve the entire amount of disk space from an initial semaphore (e.g., which may be identified randomly from among the multiple semaphores of the distributed semaphore or identified as the semaphore to which a job identifier for the job hashes to or maps to) of a plurality of semaphores for the distributed semaphore. If the job (or a disk space allocation process working on behalf of the job) cannot reserve the entire amount of disk space required by the job from the initial semaphore, then the job may identify a subset of the plurality of semaphores and compute an allocation between the semaphores of the subset of the plurality of semaphores that best balances the disk space allocations for each of the semaphores in the subset. In one example, the allocation between the semaphores of the subset may be computed using a water-filling algorithm with fixed-size reserved chunks per semaphore. One reason to not completely fill-up each semaphore of the subset is to leave disk space corresponding with the reserved chunk size for other jobs that directly map to those semaphores as initial semaphores (e.g., the initial semaphores to which those other jobs first hash); otherwise, these failed allocations will lead to more pressure on other semaphores which may narrow down the set of semaphores to which it is possible to allocate and exacerbate the contention issue. In this case, the subset of the plurality of semaphores may be sorted or ranked based on the amount of disk space available to be reserved or allocated per each semaphore and the least full semaphore of the subset may be filled until the amount of disk space per semaphore minus the reserved chunk size is reserved or the entire amount of disk space that is required for the job is reserved. If the least full semaphore cannot be used to reserve the entire amount of disk space required for the job, then the subset may be sorted again and the least full semaphore of the subset may be identified and filled until the amount of disk space for the least full semaphore minus the reserved chunk size is reached or the entire amount of disk space that is required for the job is reserved.

In one example, a job may need to reserve 500 GB of disk space or have 500 GB of disk space allocated for the job, the subset of the plurality of semaphores may comprise three semaphores associated with allocating 1 TB of disk space each, and the reserved chunk size may comprise 100 GB. For the three semaphores, a first semaphore of the three semaphores may have already been used to reserve 600 GB of disk space, a second semaphore of the three semaphores may have already been used to reserve 700 GB of disk space, and a third semaphore of the three semaphores may have already been used to reserve 800 GB of disk space. In this case, the least full semaphore of the subset comprises the first semaphore so the job (or a disk space allocation process working on behalf of the job) may reserve 300 GB of disk space from the first semaphore in order to leave 100 GB of disk space still available for the first semaphore and then reserve 200 GB of disk space from the second semaphore.

In some embodiments, the number of semaphores within a distributed semaphore may be dynamically adjusted over time and may be set or determined based on the total amount of disk space within the cluster, the total amount of available disk space within the cluster that is available for allocation to jobs to be executed within the cluster, the total number of nodes within the cluster, and/or the number of contention fails that have occurred during a particular time period (e.g., within the past thirty minutes). The number of contention fails may comprise the number of jobs that failed due to not being able to access the distributed semaphore or the number of jobs that failed to reserve disk space using the distributed semaphore due to contention for semaphores of the distributed semaphore. In one example, the number of semaphores may be determined such that each semaphore within the distributed semaphore corresponds with reservations for a fixed amount of disk space (e.g., each semaphore may correspond with reserving 10 TBs of disk space); in this case, the number of semaphores may be equal to the total amount of disk space for the cluster divided by the fixed amount of disk space per semaphore. In another example, the number of semaphores may comprise two times the number of nodes within the cluster. In another example, the number of semaphores may be set such that the number of contention fails over the particular time period is below an upper threshold for the number of contention failures; in this case, the number of semaphores may be increased such that the number of contention fails is reduced to less than the upper threshold (e.g., is not more than twenty) over a preceding period of time (e.g., over the past ten minutes). In another example, the number of semaphores may be increased if the number of contention fails over the particular time period is above a threshold number of failures (e.g., is greater than twenty). In another example, the number of semaphores may be decreased if the number of contention fails over the particular time period is below a lower threshold (e.g., is less than five) for the number of contention failures; in this case, the number of semaphores may be decreased if the number of contention fails is less than five over the past ten minutes. Increased fragmentation may increase the amount of time it takes to make a reservation or release since the number of calls (e.g., linear in the number of semaphores) that must be made to the key-value store may increase. Decreasing the number of semaphores may help to reduce fragmentation and improve performance of the system.

In other embodiments, the number of semaphores within the distributed semaphore may be fixed, but the amount of disk space that may be reserved per semaphore may be set based on the total amount of disk space within the cluster. In one example, the number of semaphores may be set to ten and the amount of disk space that may be reserved per semaphore may be equal to the total amount of disk space for the cluster divided by ten. In this case, the amount of reservable disk space per semaphore may be evenly divided among the ten semaphores.

In some embodiments, a semaphore of a plurality of semaphores for the distributed semaphore may correspond with one or more chunks (or individually reservable data partitions). In one example, the semaphore may correspond with reserving 10 TBs of disk space and the semaphore may correspond with ten different chunks, wherein each of the ten chunks corresponds with 1 TB of disk space out of the 10 TBs of disk space for the semaphore. In some cases, when a job reserves disk space from the semaphore, the job may make reservations at the granularity of the chunks. For example, if the job must reserve 3.5 TBs of disk space from the semaphore, then the job may have to reserve four of the 1 TB chunks. The sizes of the data chunks for the semaphore may be dynamically adjusted over time and set based on the amount of disk space remaining to be reserved by the semaphore and/or the total amount of available disk space within a cluster of data storage nodes. In one example, if less than a threshold amount of disk space may be reserved from a semaphore (e.g., the semaphore has less than 2 TB of disk space left to reserve out of a total of 10 TBs), then the number of chunks may be increased (e.g., doubled) such that the amount of disk space per chunk is reduced. In another example, if less than a threshold amount of disk space is available to be allocated within the cluster (e.g., there is less than 200 TBs of available disk space), then the number of chunks for each of the semaphores of the distributed semaphore may be increased (e.g., doubled) such that the amount of disk space per chunk is reduced. In another example, if more than a threshold amount of disk space may be reserved from a semaphore (e.g., the semaphore has more than 8 TB of disk space left to reserve out of a total of 10 TBs), then the number of chunks may be decreased (e.g., cut in half) such that the amount of disk space per chunk is increased.

In some cases, when a job reserves an amount of disk space from a semaphore of the distributed semaphore, the disk space reserved may first be marked as pending (e.g., one or more chunks of the semaphore may be set into a pending state) and the job may not finalize the reservation of the disk space until the job is able to reserve the entire amount of disk space necessary for the job. The job may finalize the reservation of the disk space by setting one or more chunks of the semaphore into a taken state or a reserved state. In the event that the job fails (e.g., due to a node failure) and disk space marked as pending has been pending for more than a threshold period of time (e.g., more than two minutes), then a cleanup job may be used to change the disk space marked as pending back to available or unreserved. Cleanup jobs to reclaim disk space marked as pending for more than the threshold amount of time may be run on a periodic basis (e.g., every thirty minutes). The cleanup jobs may be run more frequently (e.g., every ten minutes) if the amount of available disk space has fallen below a threshold amount of disk space (e.g., if the amount of available disk space for a cluster is less than ten percent of the total disk space or is less than 10 TB of disk space). A second job that is attempting to reserve disk space from a semaphore may reserve disk space that was marked as pending if the pending reservation for the disk space has been pending for more than the threshold period of time. In this case, subsequent jobs may be used to reclaim disk space and reserve the disk space for the subsequent jobs if one or more chunks of the semaphore have been marked as pending for more than the threshold period of time.

In some embodiments, a distributed semaphore may be used to reserve network bandwidth for the nodes in a cluster. Per-node network bandwidths may be throttled or adjusted over time to maximize the aggregate bandwidth of the cluster without exceeding a global bandwidth allowance for the entire cluster. The throttling of the individual node network bandwidths may include periodically adjusting individual node bandwidth settings for each node of a plurality of nodes within the cluster using node network interfaces. In some cases, a node of the plurality of nodes may determine an amount of node bandwidth required for the node based on the number of jobs running on the node or the number of tokens assigned to jobs running on the node and reserve the amount of node bandwidth for the node using a distributed semaphore for reserving node bandwidth from a global bandwidth allowance for the entire cluster. More information about throttling per-node network bandwidths may be found in U.S. patent application Ser. No. 15/658,348, entitled "Throttling Network Bandwidth Using Per-Node Network Interfaces," filed Jul. 24, 2017, which is herein incorporated by reference in its entirety.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
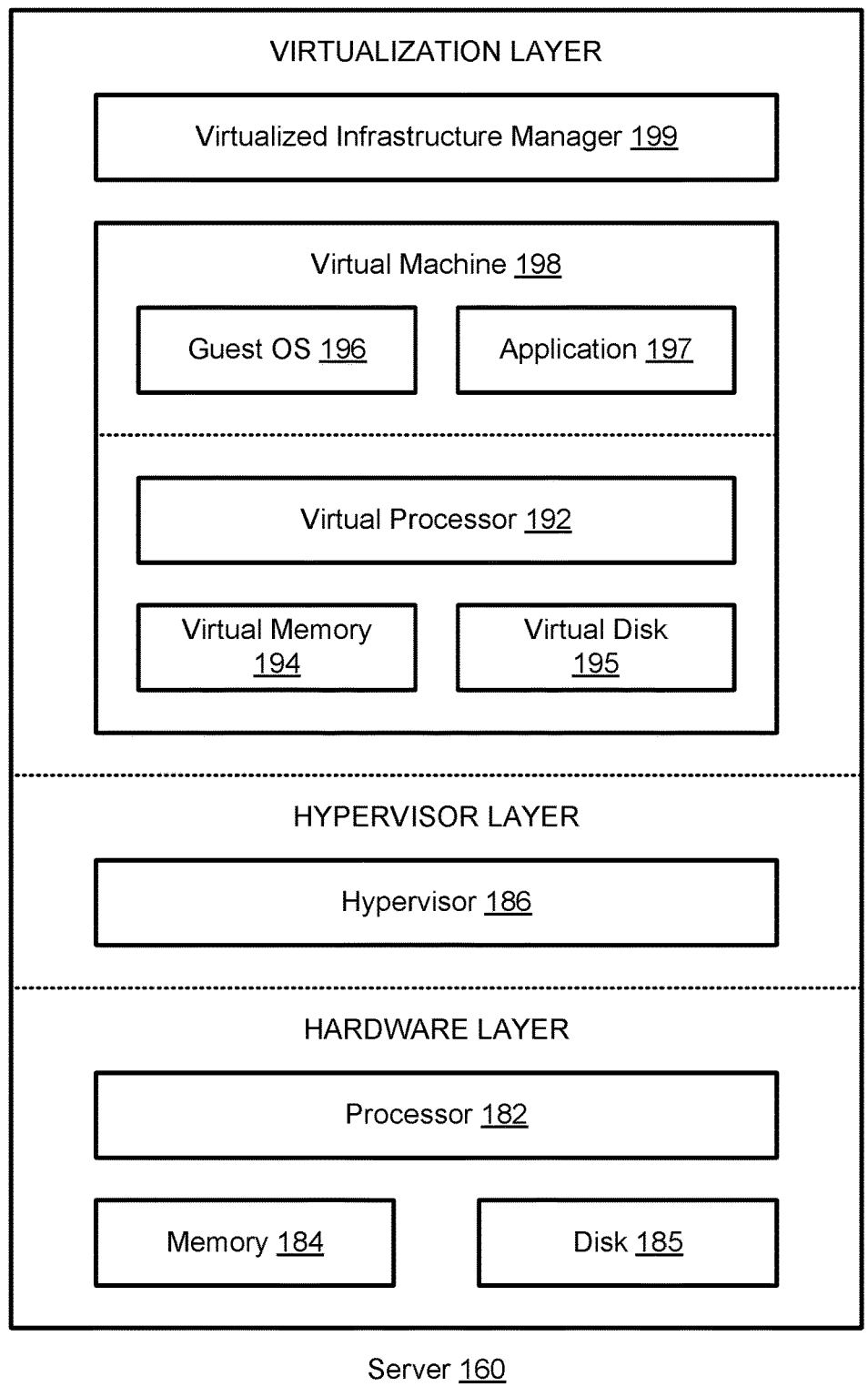
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
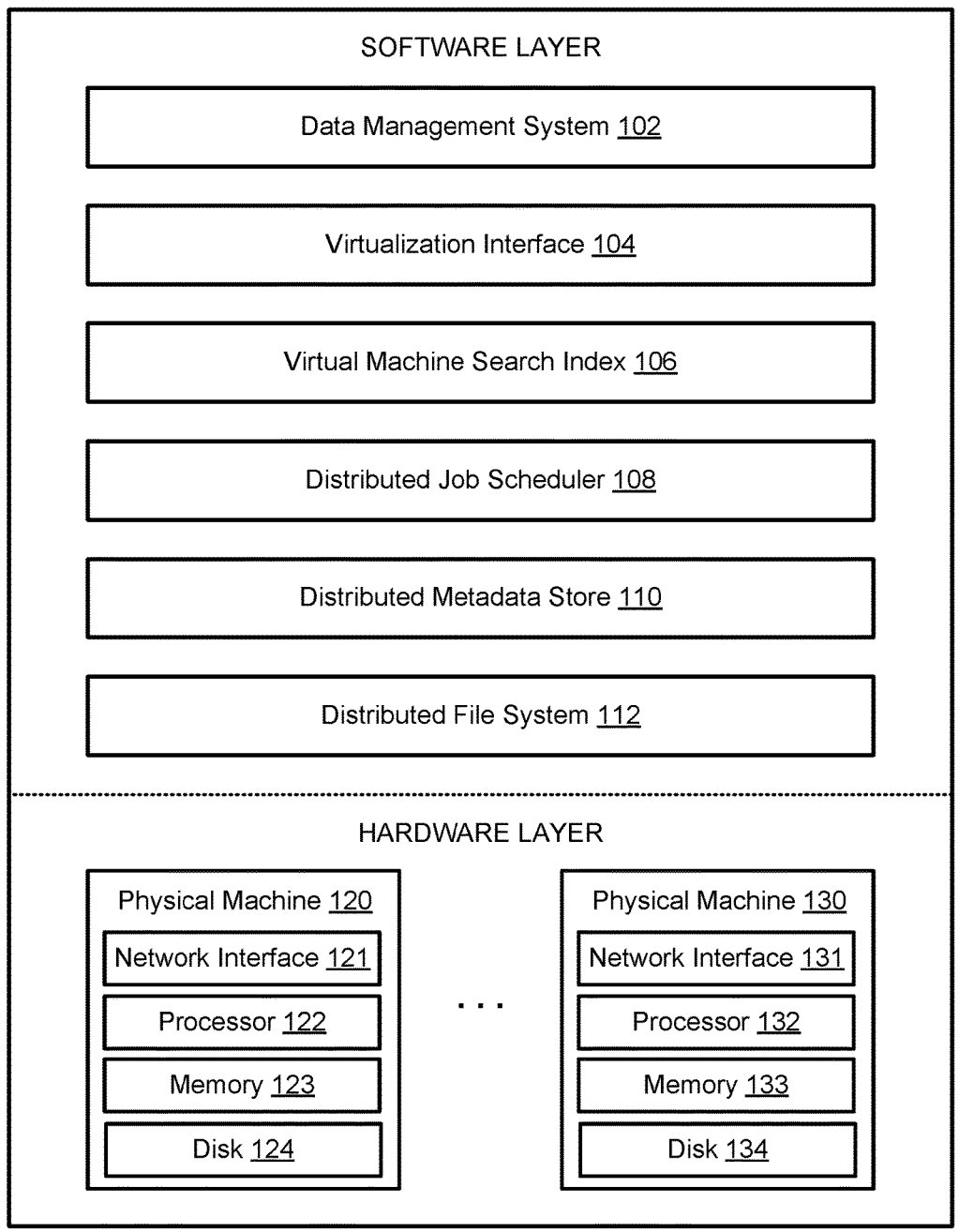
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a SSD or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
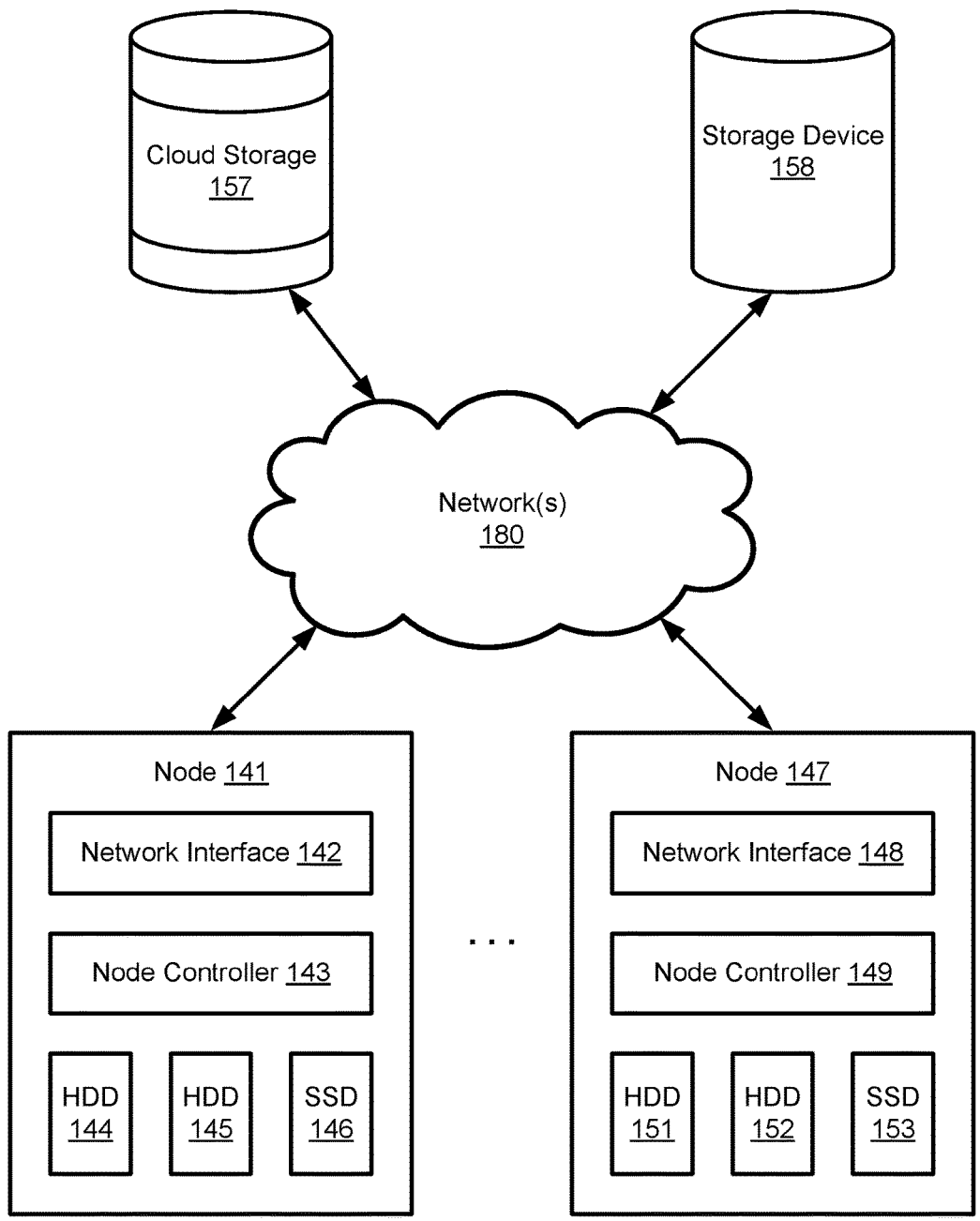
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

Figures 2D, 2E, 2F:
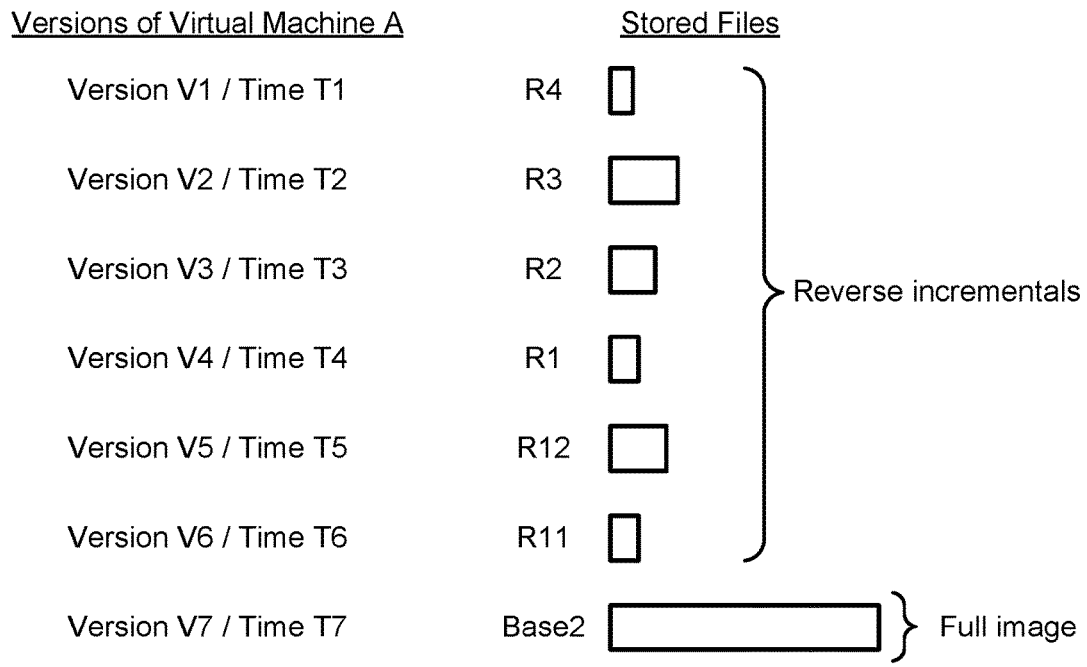
FIGS. 2A-2Q depict various embodiments of sets of files and data structures associated with managing and storing snapshots of virtual machines.
Figures 2G, 2H, 2I:
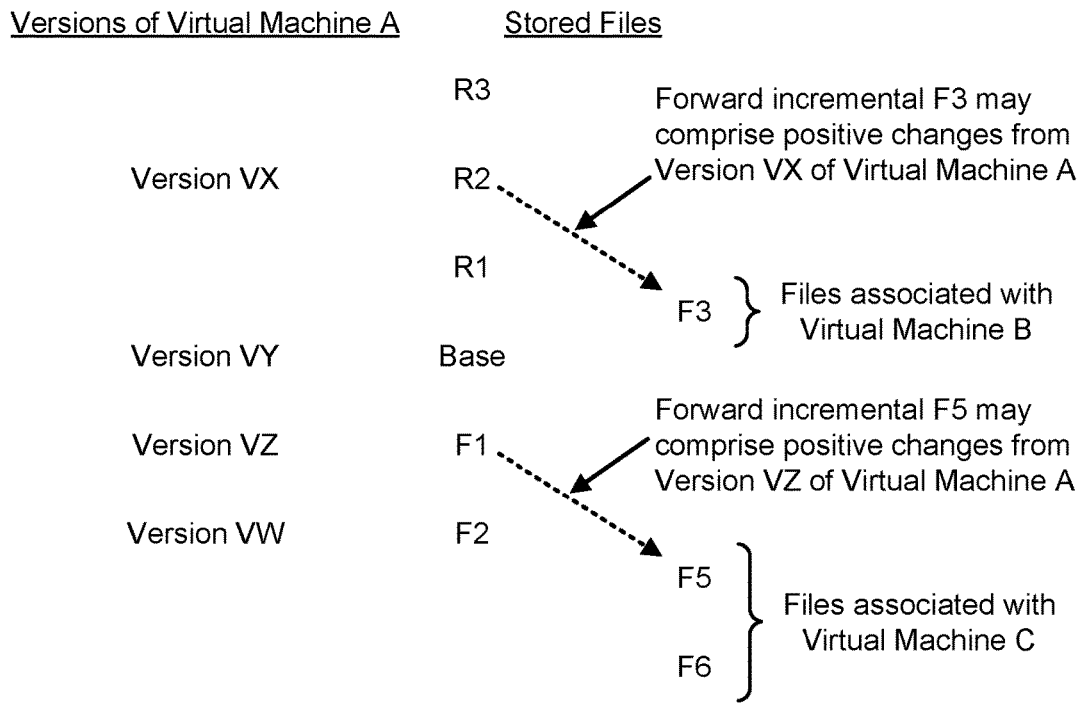
Figures 2J, 2K, 2L:
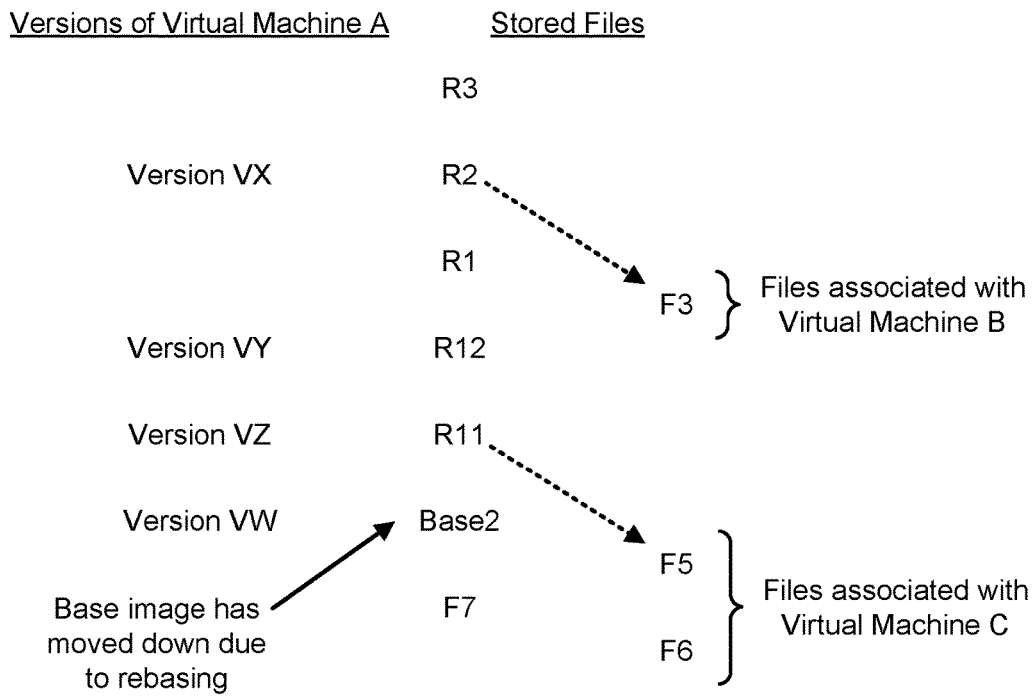
Figures 2M, 2N, 2O:
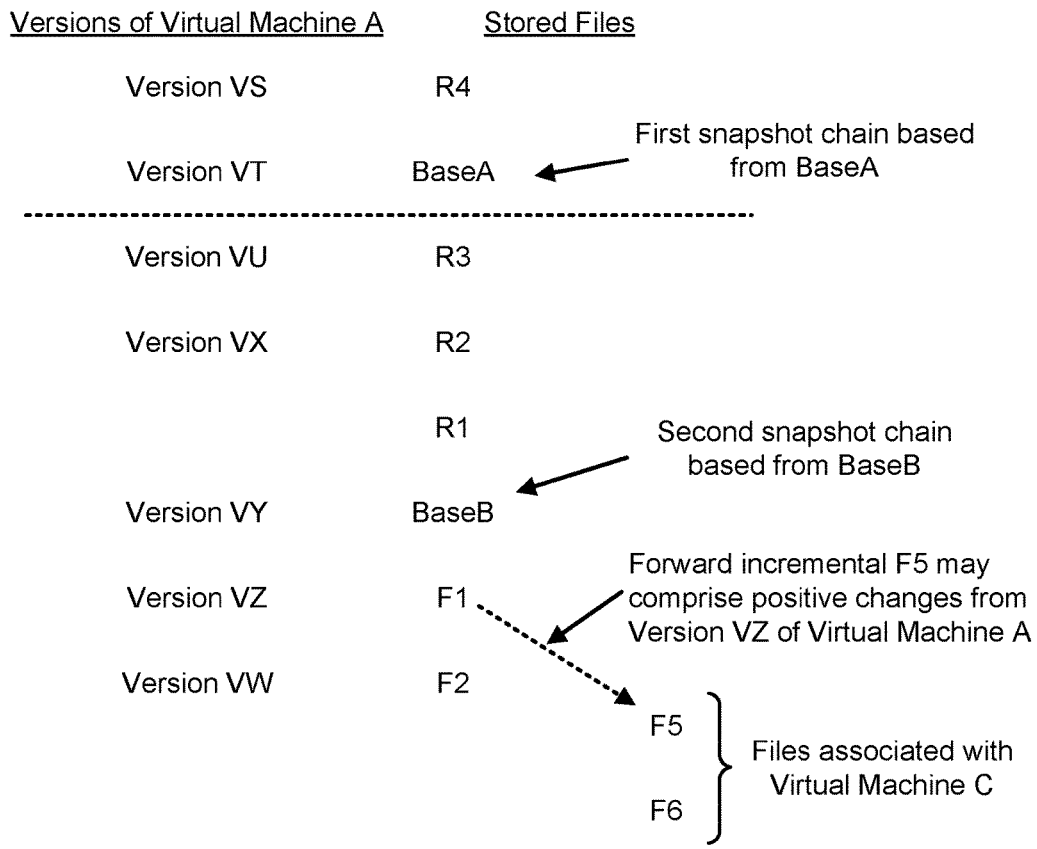
Figures 2P, 2Q:
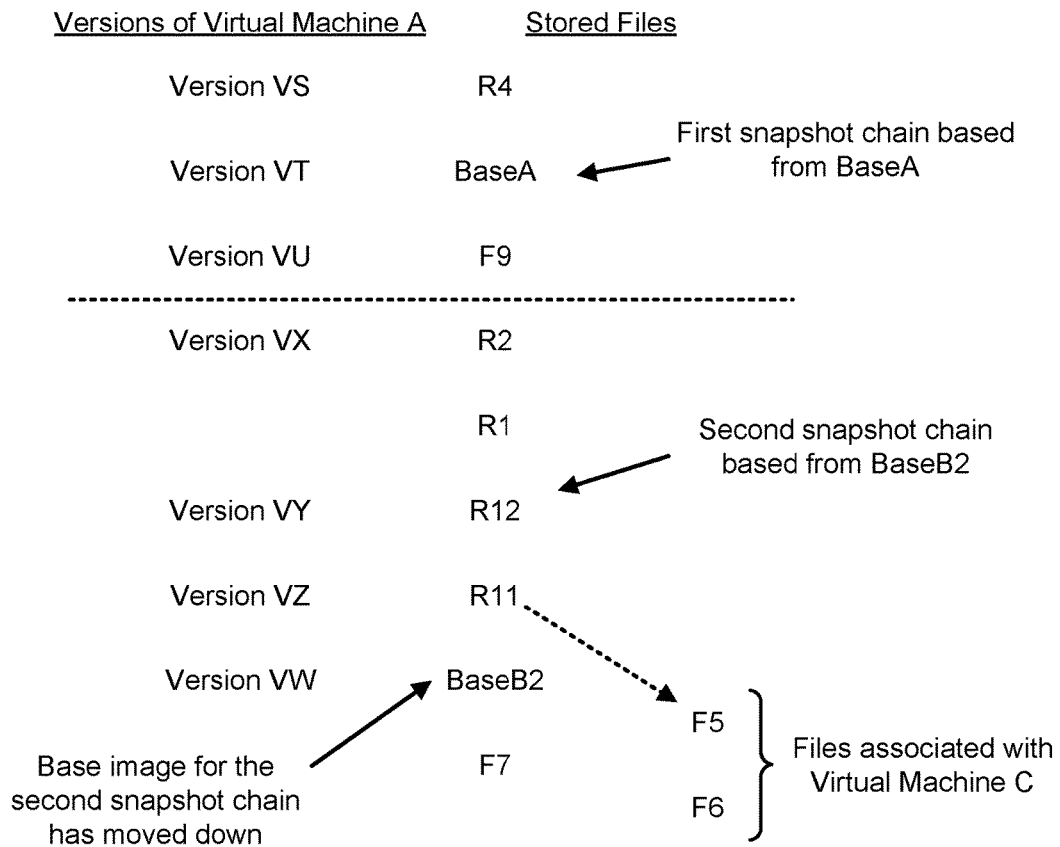

FIGS. 2A-2Q depict various embodiments of sets of files and data structures (e.g., implemented using merged files) associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6. The forward incremental F1 may include one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path/snapshots/VM_A/s6/s6.delta), and a third pointer (pF2) that references the forward incremental F2 (e.g., via the path/snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path/snapshots/VM_A/s4/s4.delta), a third pointer (pR2) that references the reverse incremental R2 (e.g., via the path/snapshots/VM_A/s3/s3.delta), and a fourth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) may be triggered when a number of forward incremental files is greater than a threshold number of forward incremental files for a snapshot chain (e.g., more than 200 forward incremental files). In other cases, a rebasing operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path/snapshots/VM_A/s6/s6.delta), a third pointer (pR12) that references the reverse incremental R12 (e.g., via the path/snapshots/VM_A/s5/s5.delta), a fourth pointer (pR1) that references the reverse incremental R1 (e.g., via the path/snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment. In some cases, a server within the production environment may boot up a failed virtual machine directly from a storage appliance, such as storage appliance 170 in FIG. 1C, acting as an NFS datastore to minimize the recovery time to recover the failed virtual machine.

FIG. 2H depicts one embodiment of a merged file for generating version V1 of Virtual Machine B using the set of files depicted in FIG. 2G. The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

FIG. 2J depicts one embodiment of a set of files associated with multiple virtual machine snapshots after a rebasing process has been performed using the set of files in FIG. 2G. The set of files may be stored using a distributed file system, such as distributed file system 112 in FIG. 1C. The rebasing process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version V1 of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some cases, a backed-up version of a first virtual machine may be generated by concurrently reading a full image of a second virtual machine different from the first virtual machine from a first storage device (e.g., a HDD) while reading one or more incrementals associated with the first virtual machine from a second storage device (e.g., an SSD) different from the first storage device.

FIG. 2M depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB), the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2N depicts one embodiment of a merged file for generating version VS of Virtual Machine A using the set of files depicted in FIG. 2M. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2O depicts one embodiment of a merged file for generating version VU of Virtual Machine A using the set of files depicted in FIG. 2M. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

FIG. 2P depicts one embodiment of a set of files associated with multiple virtual machine snapshots after a rebasing process has been performed to a snapshot chain using the set of files in FIG. 2M. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2Q depicts one embodiment of a merged file for generating version VU of Virtual Machine A using the set of files depicted in FIG. 2P. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), an existing snapshot chain (e.g., the first snapshot chain depicted in FIG. 2P) may have its chain length extended or snapshots previously assigned to the second snapshot chain may be moved to the existing snapshot chain. For example, the first snapshot chain depicted in FIG. 2M comprises two total snapshots, while the first snapshot chain depicted in FIG. 2P comprises three total snapshots as the snapshot corresponding with version VU of Virtual Machine A has moved from the second snapshot chain to the first snapshot chain.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

In some embodiments, the maximum incremental chain length, the maximum reverse incremental chain length, or the maximum forward incremental chain length for a snapshot chain may be adjusted over time as nodes or disks are added to or removed from a cluster or upon an update to a data backup and archiving schedule for a virtual machine due to the assignment of a new backup class or a new backup, replication, and archival policy. In one example, the maximum incremental chain length may be increased from 200 incrementals to 500 incrementals if the number of nodes or disks falls below a threshold number (e.g., is less than four nodes). In another example, the maximum incremental chain length may be increased from 100 incrementals to 200 incrementals if the available disk storage falls below a threshold amount if disk space (e.g., the amount of available disk space is less than 20 TB).

Figure 3A:
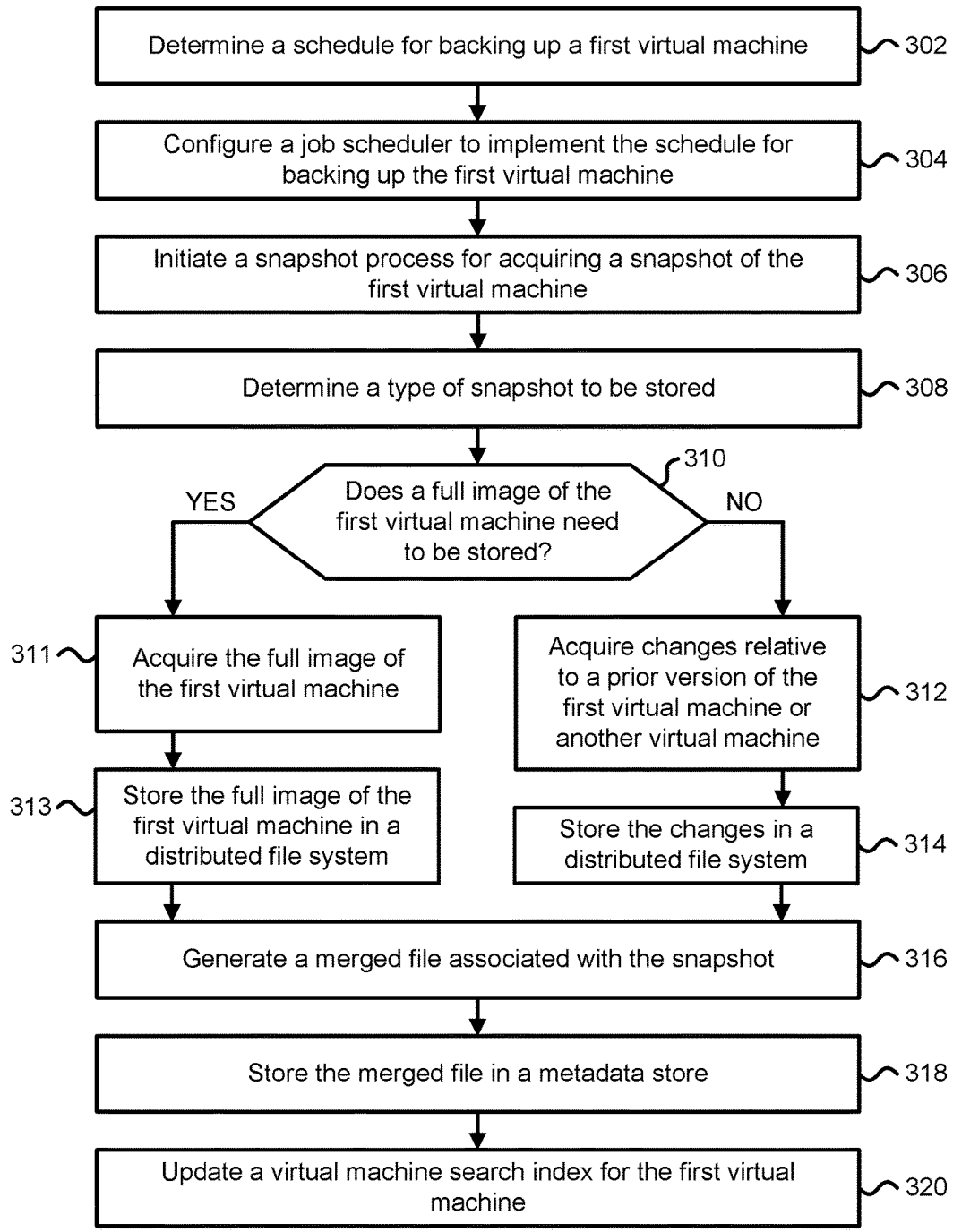
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operation system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
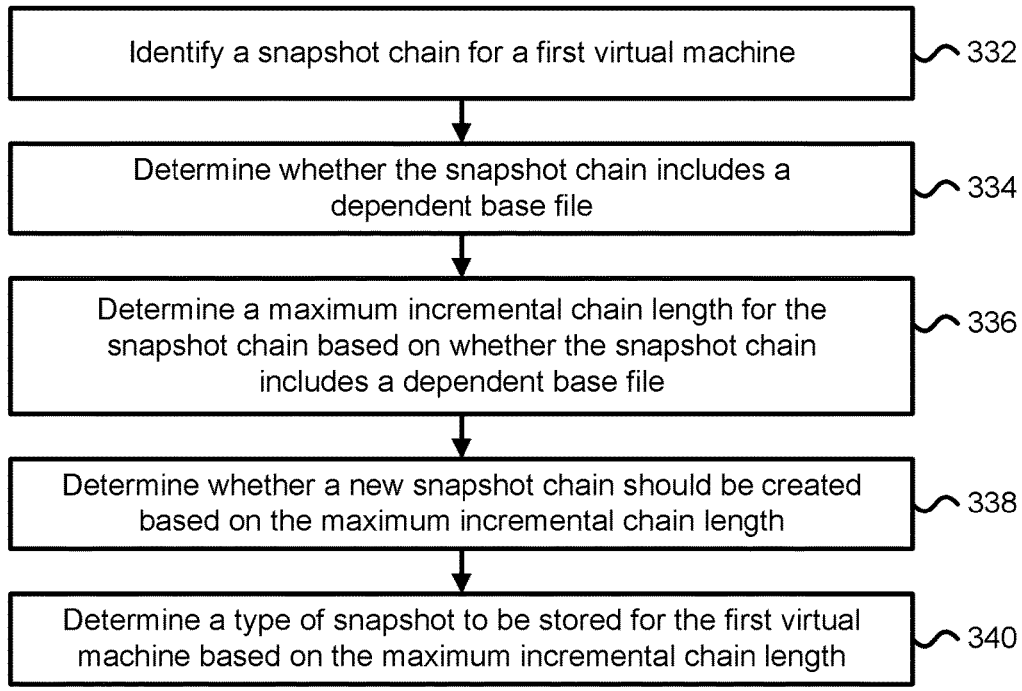
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive. One example of backed-up versions of a virtual machine being stored using one or more snapshot chains is depicted in FIG. 2P in which the versions of Virtual Machine A are stored using a first snapshot chain anchored by full image BaseA and a second snapshot chain anchored by full image BaseB2.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

Figure 3C:
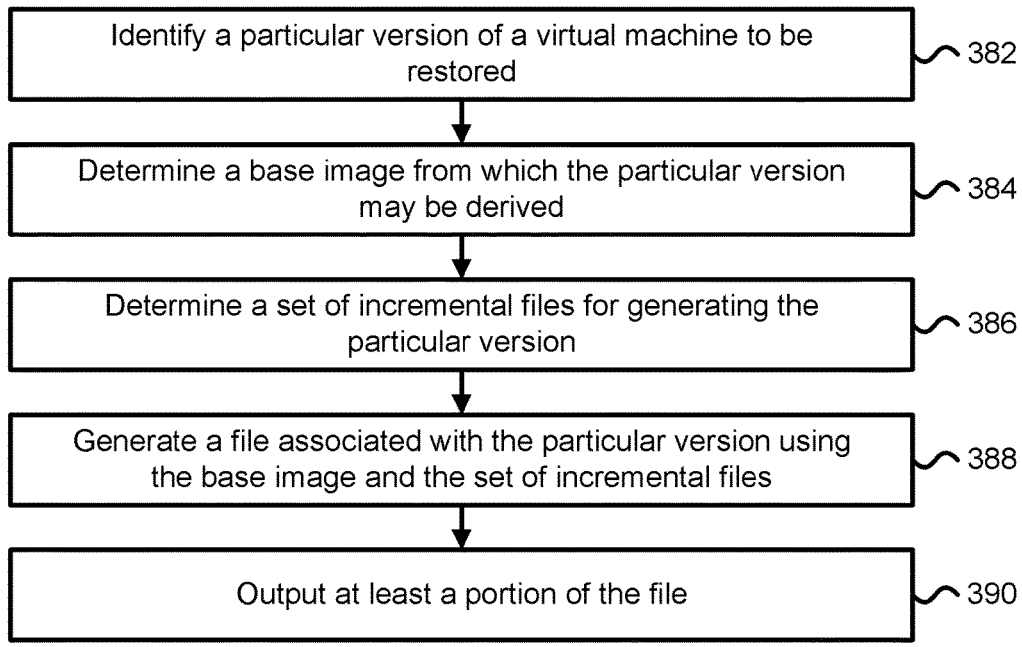
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and one or more reverse incremental files. In step 388, a file associated with the particular version is generated using the base image and the set of incremental files. The file may be generated by patching the set of incremental files onto the base image.

In one example, referring to FIG. 2G, if the particular version of the virtual machine corresponds with Version V2 of Virtual Machine C, then the base image may correspond with the file Base in FIG. 2G and the set of incremental files may correspond with files F1, F5, and F6 of FIG. 2G. In another example, referring to FIG. 2G, if the particular version corresponds with Version V1 of Virtual Machine B, then the base image may correspond with the file Base in FIG. 2G and the set of incremental files may correspond with files R1, R2, and F3 of FIG. 2G. The set of incremental files may include a first subset of incremental files corresponding with the virtual machine (e.g., Virtual Machine C) and a second subset of incremental files corresponding with a second virtual machine (e.g., Virtual Machine A) different from the virtual machine. In step 390, at least a portion of the file is outputted. The at least the portion of the file (e.g., 100 GB of the file) may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine. Referring to FIG. 2G, the incremental file F5 may comprise a dependent base file for Virtual Machine C and the incremental file F3 may comprise a dependent base file for Virtual Machine B. Data deduplication techniques may be applied to identify a candidate base image from which a dependent base file may depend and to generate the dependent base file.

Figure 4A:
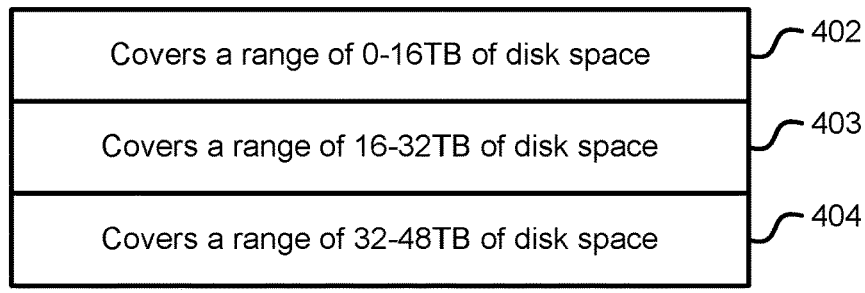
FIG. 4A depicts one embodiment of a distributed semaphore comprising three semaphores for reserving disk space that may be allocated to jobs running on data storage nodes within a cluster.

FIG. 4A depicts one embodiment of a distributed semaphore comprising three semaphores for reserving disk space that may be allocated to jobs running on data storage nodes within a cluster. The data storage nodes may include nodes 141 and 147 in FIG. 1D. Each semaphore of the distributed semaphore may correspond with a unique key for accessing the semaphore. As depicted, if the total disk space for the cluster comprises 48 TBs of disk space, then a first semaphore 402 of the three semaphores may be used to reserve disk space within a range of 0-16 TB of disk space, a second semaphore 403 of the three semaphores may be used to reserve disk space within a range of 16 TB-32 TB of disk space, and a third semaphore 404 of the three semaphores may be used to reserve disk space within a range of 32 TB-48 TB of disk space.

In one embodiment, a job to be run using the cluster may use the distributed semaphore to reserve and/or allocate an amount of disk space required by the job during execution of the job prior to the job being executed by a node within the cluster. A job scheduler, such as the distributed job scheduler 108 in FIG. 1C, may identify the job prior to assignment of the job to the node within the cluster and may utilize a computing process to reserve the amount of disk space required by the job during execution of the job using the distributed semaphore. In one example, the job may require 24 TBs of disk space during execution of the job and may reserve the 24 TBs of disk space using the first semaphore 402 and the second semaphore 403. After the job has been run, the reserved disk space may be unreserved or freed from reservation and made available to subsequent jobs. In the case that the 24 TBs of disk space are reserved using the entire first semaphore 402 and the entire second semaphore 403, 8 TBs of disk space may be unnecessarily reserved for the job.

The distributed semaphore may be stored using one or more tables that are stored using a distributed key-value store or a distributed metadata store, such as the distributed metadata store 110 in FIG. 1C. The distributed key-value store may comprise a distributed NoSQL key-value store database. Each of the semaphores within the distributed semaphore may correspond with a unique identifier or a unique key for accessing or modifying the semaphore. Each of the semaphores within the distributed semaphore may correspond with a different row in a table for the distributed semaphore. The table may be stored using the distributed key-value store. In one example, the distributed semaphore may append a linear identifier to a global name for the distributed semaphore to each of the individual semaphores. In this case, the first semaphore 402 may be identified as "SEM_1," the second semaphore 403 may be identified as "SEM_2," and the third semaphore 404 may be identified as "SEM_3." In one embodiment, a semaphore of the distributed semaphore may comprise a binary semaphore or a mutex. The semaphore may include a variable that may be set in order to provide mutually exclusive access to a particular resource, such as the allocation of a portion of a disk space to a job. The variable may be set into an available or unavailable state for the resource. The variable may be set into a reserved or unreserved state for the portion of the disk space. In some cases, the variable may be set into a reserved, pending reservation, or unreserved state for the portion of the disk space.

One benefit of increasing the number of semaphores for the distributed semaphore is that the load on each semaphore or the load on each row within a table for the distributed semaphore may be reduced. As the number of semaphores increases, the number of times that each semaphore of the distributed semaphore is accessed may be reduced. However, increasing the number of semaphores may lead to an increase in fragmentation of allocated disk space, which may adversely impact performance.

Figure 4B:
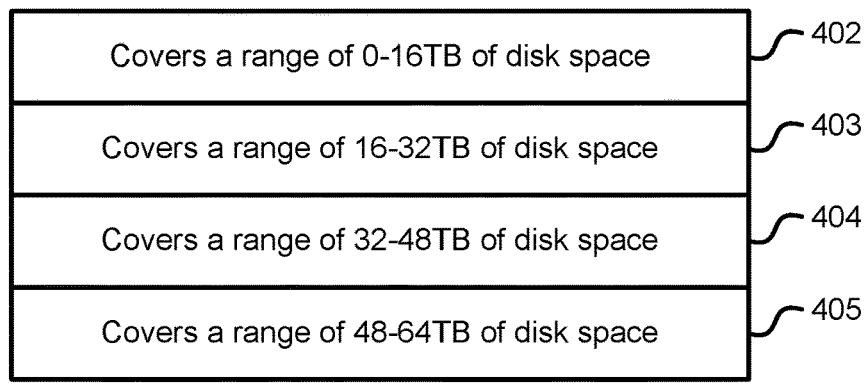
FIG. 4B depicts one embodiment of a distributed semaphore comprising four semaphores for reserving disk space accessible by data storage nodes within a cluster.

FIG. 4B depicts one embodiment of a distributed semaphore comprising four semaphores for reserving disk space accessible by data storage nodes within a cluster. As the number of nodes within the cluster may vary over time (e.g., due to nodes being added or removed from the cluster), the total disk space available to jobs running within the cluster may also vary over time. As depicted, if the total disk space for the cluster comprises 64 TBs of disk space, then the three semaphores 402-403 may be used to reserve disk space within the range of 0-48 TBs and a fourth semaphore 405 may be used to reserve disk space within a range of 48-64 TBs.

In some cases, on a periodic basis (e.g., every ten minutes), the number of semaphores within the distributed semaphore may be adjusted or set based on the number of nodes within a cluster or based on the total amount of disk space corresponding with the nodes within the cluster. In one example, the number of semaphores may comprise a total amount of disk space divided by 16 TBs per semaphore. In other cases, the number of semaphores within the distributed semaphore may be fixed and the total amount of disk space that may be reserved may be evenly divided per semaphore (e.g., the total amount of disk space may be evenly divided among ten semaphores).

Figure 4C:
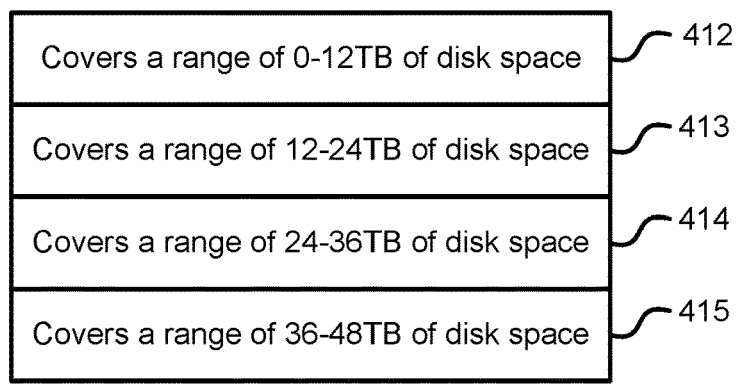
FIG. 4C depicts another embodiment of a distributed semaphore comprising four semaphores for reserving disk space accessible by data storage nodes within a cluster.

FIG. 4C depicts another embodiment of a distributed semaphore comprising four semaphores for reserving disk space accessible by data storage nodes within a cluster. As depicted, if the total disk space for the cluster comprises 48 TBs of disk space, then a first semaphore 412 of the four semaphores may be used to reserve disk space within a range of 0-12 TB of disk space, a second semaphore 413 of the four semaphores may be used to reserve disk space within a range of 12 TB-24 TB of disk space, a third semaphore 414 of the four semaphores may be used to reserve disk space within a range of 24 TB-36 TB of disk space, and a fourth semaphore 415 of the four semaphores may be used to reserve disk space within a range of 36 TB-48 TB of disk space.

In some cases, on a periodic basis or upon detection that a node has been added to or removed from a cluster, the number of contention fails may be determined based on the number of times that jobs failed to allocate adequate disk space from the distributed semaphore over a particular period of time (e.g., over the past ten minutes). As the number of contention fails associated with jobs that have failed to access the distributed semaphore or have failed to reserve the required amount of disk space changes over time, the number of semaphores for the distributed semaphore may be adjusted such that the number of contention fails is between an upper threshold (e.g., not more than 100 contention fails over a ten minute period of time) and a lower threshold (e.g., more than ten contention fails over the ten minute period of time). In cases where the number of contention fails is less than the lower threshold, then the number of semaphores may be reduced in order to reduce fragmentation of the disk space. In cases where the number of contention fails is greater than the upper threshold, then the number of semaphores may be increased in order to reduce the number of contention fails.

In one embodiment, upon detection that the number of contention fails over the particular period of time has exceeded the upper threshold, the number of semaphores may be increased from three semaphores, such as the distributed semaphore with three semaphores depicted in FIG. 4A, to four semaphores, such as the distributed semaphore with four semaphores depicted in FIG. 4C.

Figure 4D:
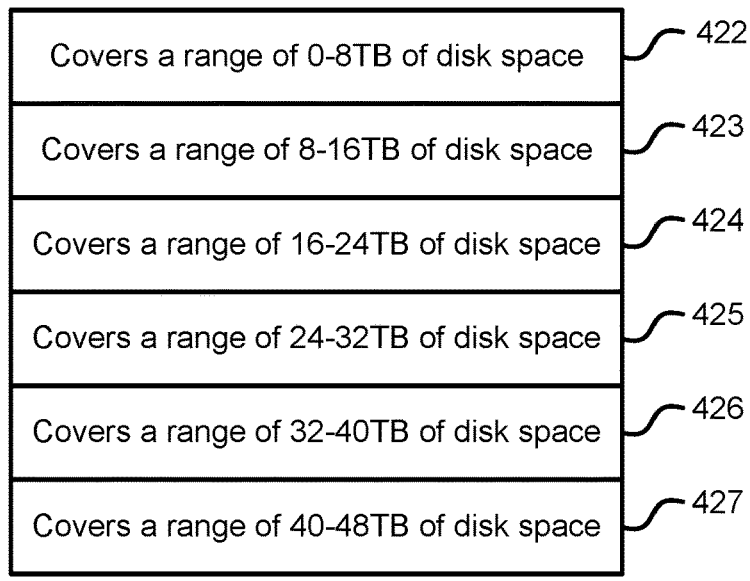
FIG. 4D depicts one embodiment of a distributed semaphore comprising six semaphores for reserving disk space accessible by data storage nodes within a cluster.

FIG. 4D depicts one embodiment of a distributed semaphore comprising six semaphores for reserving disk space accessible by data storage nodes within a cluster. As depicted, if the total disk space for the cluster comprises 48 TBs of disk space, then the six semaphores 422-427 may be used to cover 8 TB disk spaces within the range of 0-48 TBs of disk space. In one embodiment, upon detection that the number of contention fails over a particular period of time has exceeded an upper threshold by at least ten contention failures, the number of semaphores may be increased from three semaphores, such as the distributed semaphore with three semaphores depicted in FIG. 4A, to six semaphores, such as the distributed semaphore with six semaphores depicted in FIG. 4D. If the number of contention fails over the particular period of time exceeded the upper threshold, then the number of semaphores may be increased from three semaphores, such as the distributed semaphore with three semaphores depicted in FIG. 4A, to four semaphores, such as the distributed semaphore with four semaphores depicted in FIG. 4C. In another embodiment, upon detection that the number of contention fails over the particular period of time was less than ten contention failures or less than a lower threshold, the number of semaphores may be decreased from six semaphores to three semaphores (e.g., cut in half). As the number of semaphores is decreased, the amount of disk space covered by each of the semaphores may increase (e.g., from covering 8 TBs of disk space to covering 16 TBs of disk space).

Figure 4E:
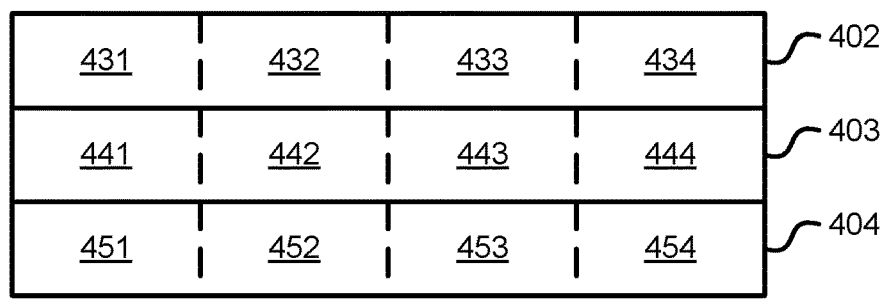
FIG. 4E depicts one embodiment of the distributed semaphore depicted in FIG. 4A with fixed-size chunks per semaphore.

FIG. 4E depicts one embodiment of the distributed semaphore depicted in FIG. 4A with fixed-size chunks per semaphore. As the first semaphore 402 covers 16 TBs of disk space, each chunk of the four data chunks 431-434 covers 4 TBs of disk space. In some cases, each of the semaphores within the distributed semaphore may have the same number of chunks and each of the chunks may be of the same fixed size (e.g., each of the chunks may cover 4 TBs or 10 TBs of disk space). Each of the chunks within a semaphore may correspond with a different variable that may be set to specify whether the disk space corresponding with the chunk is pending, reserved, or unreserved.

Figure 4F:
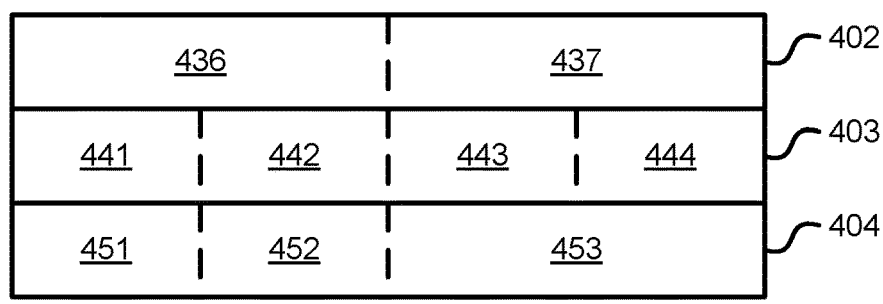
FIG. 4F depicts another embodiment of the distributed semaphore depicted in FIG. 4A with different-sized chunks per semaphore.

FIG. 4F depicts another embodiment of the distributed semaphore depicted in FIG. 4A with different-sized chunks per semaphore. As depicted, the first semaphore 402 includes two chunks 436-437 that each cover 8 TBs of disk space, the second semaphore 403 includes four chunks 441-444 that each cover 4 TBs of disk space, and the third semaphore 404 includes two chunks 451-452 that each cover 4 TBs of disk space and a third chunk 453 that covers 8 TBs of disk space.

The determination of chunk sizes may be made on a per distributed semaphore basis such that every chunk within the distributed semaphore covers the same amount of disk space. In one example, each of the chunks for the distributed semaphore depicted in FIG. 4E may comprise chunks associated with 4 TBs of disk space. In another example, the chunk size for each of the chunks within the distributed semaphore may be set based on the amount of available disk space that has not yet been allocated to jobs running within the cluster. If the amount of available disk space is below a threshold amount of disk space (e.g., there is less than 20 TBs of available disk space), then the chunk size may be cut in half or reduced in order to improve utilization of the remaining available disk space. In some cases, the chunk sizes corresponding with unreserved chunks within a semaphore may be cut in half if the amount of available disk space is detected to be less than the threshold amount of disk space. As an example, the chunk 453 for the third semaphore depicted in FIG. 4E may have been marked as reserved and therefore the reduction in chunk size only created the two chunks 451-452. Conversely, if the amount of available disk space is greater than the threshold amount of disk space, then the chunk size may be increased (e.g., doubled in size).

The determination of chunk sizes may be made on a per semaphore basis. In one embodiment, the chunk size may be set based on an amount of reservable disk space associated with the disk space covered by the semaphore. In one example, if the amount of reservable disk space (e.g., the amount of disk space that has not been marked as taken or reserved and is available to be reserved by a job) is greater than a threshold amount of disk space (e.g., is more than 8 TBs of disk space), then the chunk size may be set to 8 TBs of disk space; otherwise, if the amount of reservable disk space is less than or equal to the threshold amount of disk space, then the chunk size may be set to 4 TBs of disk space. Reducing the chunk size as the amount of reservable disk space decreases may improve utilization of the allocated disk space.

Figure 4G:
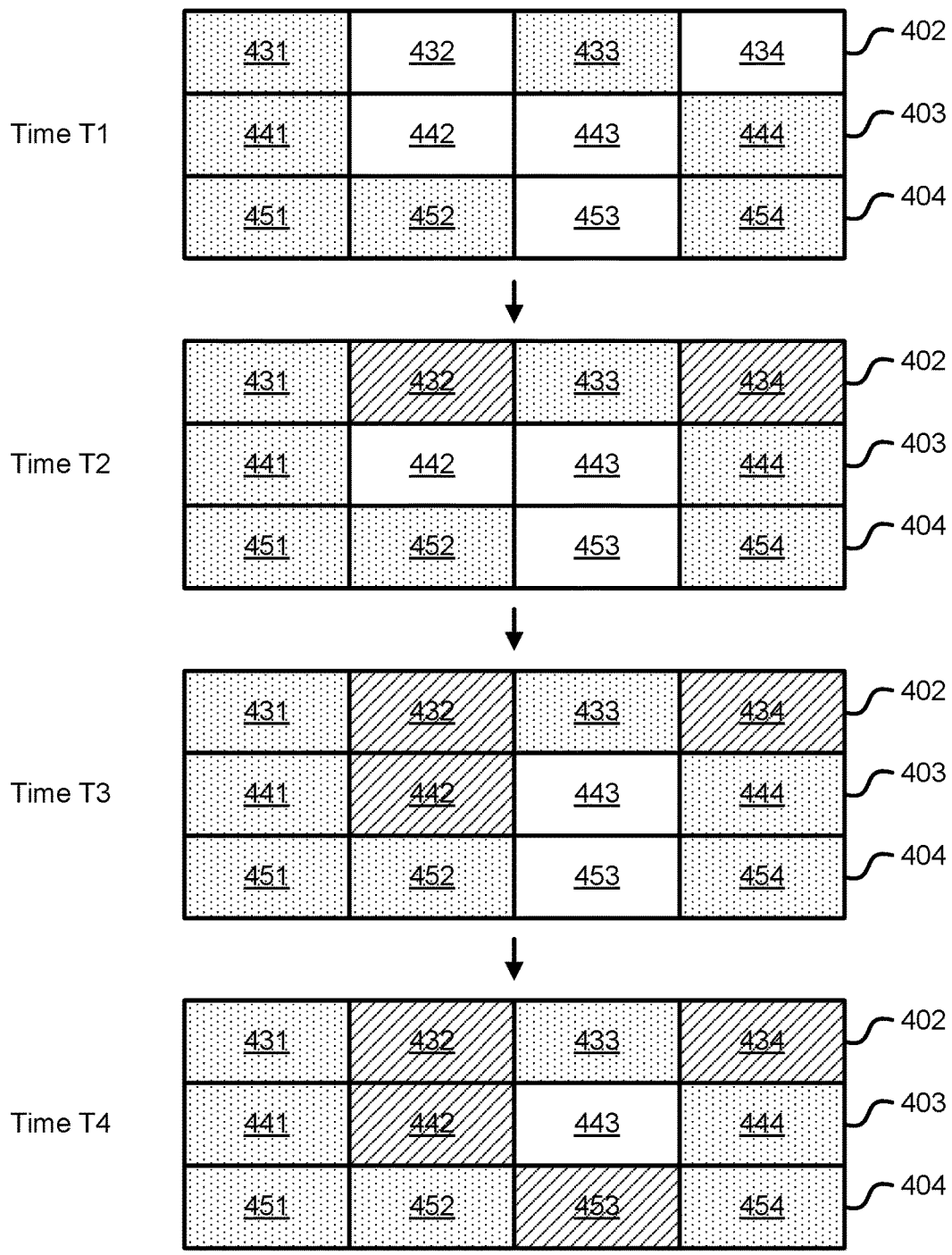
FIG. 4G depicts one embodiment of the distributed semaphore depicted in FIG. 4E over time as disk space for a job is reserved.

FIG. 4G depicts one embodiment of the distributed semaphore depicted in FIG. 4E over time as disk space for a job is reserved. The job may require 16 TBs of disk space during execution of the job. At time T1, the distributed semaphore may have two chunks 431 and 433 of the first semaphore 402 marked as reserved and two chunks 432 and 434 marked as unreserved or available. The second semaphore 403 may have two chunks 441 and 444 marked as reserved and two chunks 442-443 marked as unreserved. The third semaphore 404 may have three chunks 451-452 and 454 marked as reserved and one chunk 453 marked as unreserved.

The job (or a process working on behalf of the job) may identify an initial semaphore for reserving the required 16 TBs of disk space. The initial semaphore may be identified using a job identifier for the job (e.g., via the job identifier modulo the number of semaphores within the distributed semaphore). The job may then attempt to reserve as much of the required 16 TBs of disk space from the initial semaphore. In this case, the job may reserve at most 8 TBs of the 16 TBs. At time T2, the chunks 432 and 434 for the first semaphore 402 have been marked as reserved for the job. The job may then identify another semaphore of the distributed semaphore that has the greatest amount of reservable disk space. In this case, the second semaphore 403 comprises the semaphore with the greatest amount of reservable disk space. However, rather than reserving the entire 8 TBs that may be reserved from the second semaphore 403, the job may only reserve 4 TBs in order to leave reservable disk space available to jobs that directly map to the second semaphore 403 as their initial semaphore. In one example, a reserved chunk size (e.g., set to 4 TBs of disk space) may be acquired and the job may attempt to reserve as much disk space as possible from the second semaphore 403 up to the amount of disk space reservable by the second semaphore 403 minus the reserved chunk size. At time T3, the chunk 442 for the second semaphore 403 has been reserved. At time T4, the chunk 453 for the third semaphore 404 has been reserved. Upon detection that the required 16 TBs of disk space has been reserved, the 16 TBs of disk space corresponding with the reserved portions of the distributed semaphore may be allocated to the job. The job may maintain a list of the semaphores and/or the chunks within each of the semaphores used to obtain the allocated disk space and use the list to release the semaphores and the reserved chunks upon completion of the job. The job may release the semaphores and the reserved chunks by marking the reserved chunks as unreserved or available.

Figure 5A:
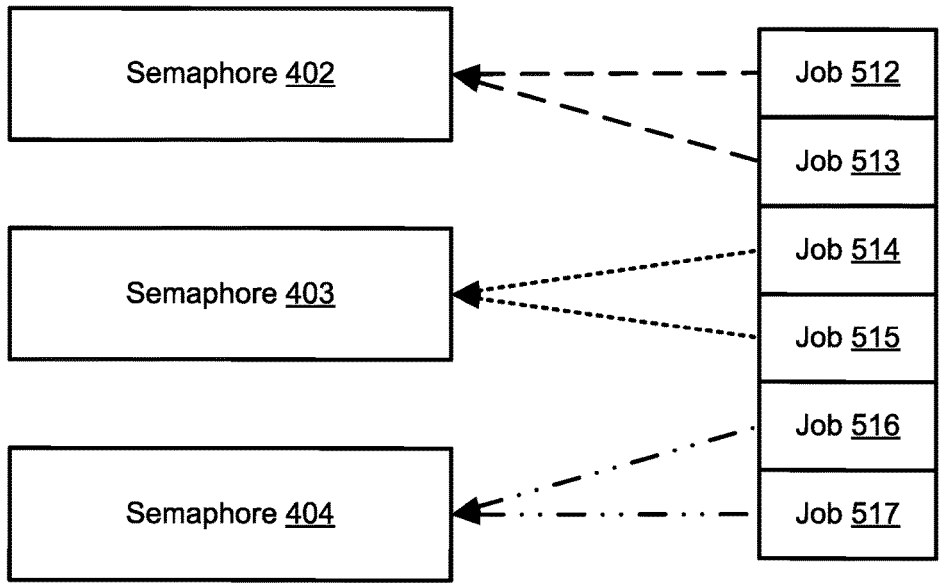
FIG. 5A depicts one embodiment of initial mappings from jobs to initial semaphores.

FIG. 5A depicts one embodiment of initial mappings from jobs to initial semaphores. As depicted, jobs 512-513 map to the first semaphore 402, jobs 514-515 map to the second semaphore 403, and jobs 516-517 map to the third semaphore 404. The initial mappings may be used to identify the initial semaphore (or the first semaphore) of the distributed semaphore to which a job may attempt to reserve as much of its required disk space as possible.

Figure 5B:
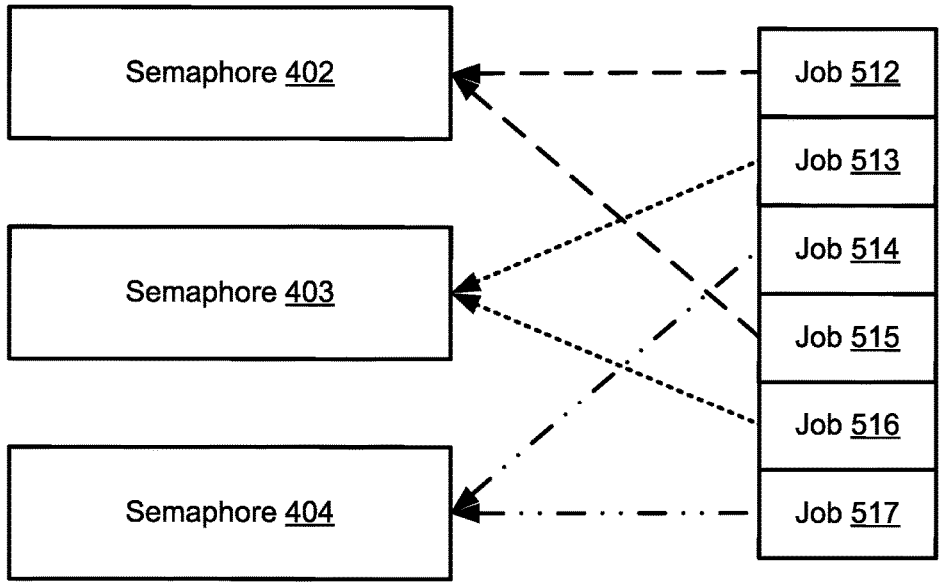
FIG. 5B depicts another embodiment of initial mappings from jobs to initial semaphores.

FIG. 5B depicts another embodiment of initial mappings from jobs to initial semaphores. As depicted, jobs 512 and 515 map to the first semaphore 402, jobs 513 and 516 map to the second semaphore 403, and jobs 514 and 517 map to the third semaphore 404. The initial mapping from a particular job to its initial semaphore of a distributed semaphore may comprise a hash function. The initial mapping may map a job identifier for the particular job to one of the semaphores within the distributed semaphore. In one example, the initial mapping may comprise acquiring the job identifier for the job and computing the job identifier modulo N, where N is the number of semaphores within the distributed semaphore. In some cases, if it is detected that a threshold number of initial semaphores are completely reserved or that a threshold number of jobs were not able to reserve any disk space from their initial semaphores, then the initial mapping may be modified. In one example, if it is detected that 100 jobs have mapped to initial semaphores that were completely reserved within the past ten minutes, then the initial mapping may be updated to be the job identifier plus an offset modulo N, where N is the number of semaphores within the distributed semaphore. In another example, if it is detected that 50 jobs have mapped to initial semaphores that were completely reserved within the past ten minutes, then the initial mappings may be changed from the initial mappings depicted in FIG. 5B to the initial mappings depicted in FIG. 5A.

Figure 6A:
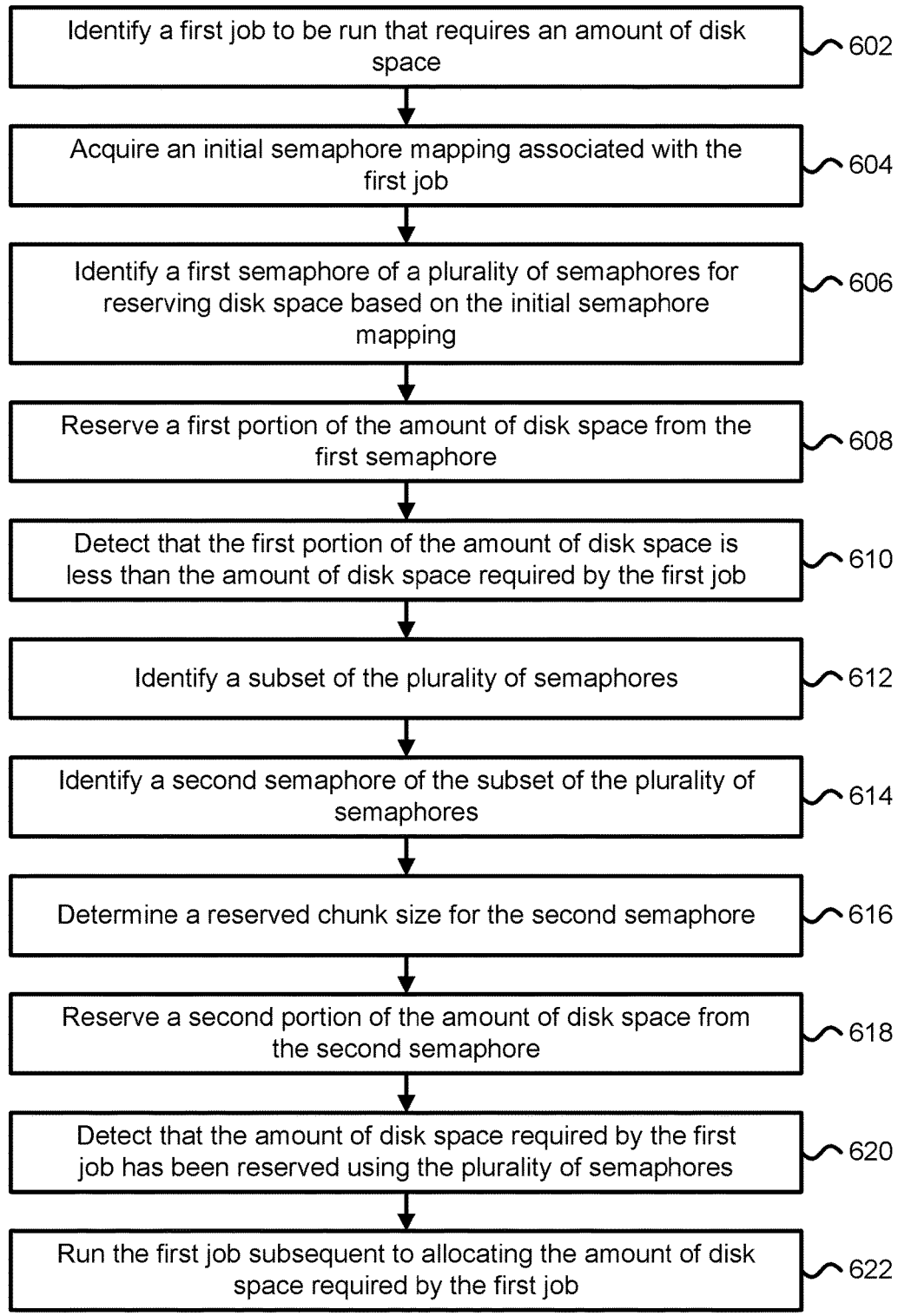
FIG. 6A is a flowchart describing one embodiment of a process for allocating disk space using a distributed semaphore.

FIG. 6A is a flowchart describing one embodiment of a process for allocating disk space using a distributed semaphore. In one embodiment, the process of FIG. 6A may be performed by a storage appliance, such as storage appliance 170 or storage appliance 140 in FIG. 1A. The process of FIG. 6A may be performed by a data storage node, such as node 141 in FIG. 1D.

In step 602, a first job to be run that requires an amount of disk space is identified. In one example, a job scheduler, such as the distributed job scheduler 108 in FIG. 1C, may identify the first job. The first job may comprise a job for capturing and storing a snapshot of a real or virtual machine. The amount of disk space required by the first job may depend upon the size of the snapshot to be stored. In step 604, an initial semaphore mapping associated with the first job is acquired. The initial semaphore mapping may provide a mapping for the first job to a first semaphore (or an initial semaphore) of a distributed semaphore used for reserving disk space. The initial semaphore mapping may map a job identifier for the first job to the first semaphore. In one example, the initial semaphore mapping may map the job identifier for the first job modulo the number of semaphores within the distributed semaphore to the first semaphore.

In step 606, a first semaphore of a plurality of semaphores for reserving disk space is identified based on the initial semaphore mapping. In step 608, a first portion of the amount of disk space is reserved from the first semaphore. In one example, the first semaphore may correspond with the first semaphore 402 in FIG. 4G and the reservation of the first portion may correspond with the reservations of chunks 432 and 434 at time T2 in FIG. 4G. In some cases, the first portion of the amount of disk space may be reserved by marking chunks within the first semaphore as reserved. In other cases, the chunks within the first semaphore may be marked as pending allocation and may be marked as reserved once the entire amount of disk space required by the first job has been reserved or allocated.

In step 610, it is detected that the first portion of the amount of disk space is less than the amount of disk space required by the first job. In this case, the entire amount of disk space required by the first job cannot be reserved using only the first semaphore. In step 612, a subset of the plurality of semaphores is identified. In one embodiment, the subset of the plurality of semaphores may be randomly selected from the plurality of semaphores (e.g., via the random selection of three semaphores out of the plurality of semaphores). In another embodiment, the subset of the plurality of semaphores may be determined as the three semaphores out of the plurality of semaphores with the greatest amount of available disk space to be reserved. In some cases, the number of semaphores for the subset of the plurality of semaphores may be determined based on the amount of reservable disk space that may be reserved from the subset. In step 614, a second semaphore of the subset of the plurality of semaphores is identified. The second semaphore may correspond with the semaphore out of the subset with the greatest amount of available disk space or the greatest number of chunks that are not marked reserved or pending allocation.

In step 616, a reserved chunk size for the second semaphore is determined. The reserved chunk size may correspond with an amount of disk space that is to be left available for other jobs to reserve. In one example, the reserved chunk size may correspond with a threshold percentage of the amount of disk space covered by the second semaphore (e.g., the reserved chunk size may comprise twenty percent of the amount of disk space covered by the second semaphore). In another example, the reserved chunk size may be determined based on a historical amount of disk space required by jobs that directly map to the second semaphore or for which the second semaphore comprises the initial semaphore.

In step 618, a second portion of the amount of disk space is reserved from the second semaphore. The second portion of the amount of disk space may comprise the remaining amount of disk space required by the first job. In some cases, the second portion of the amount of disk space may be reserved only if the second portion of the amount of disk space may be reserved from the second semaphore leaving disk space associated with the reserved chunk size available or unreserved. In step 620, it is detected that the amount of disk space required by the first job has been reserved using the plurality of semaphores. Upon detection that the amount of disk space required by the first job has been reserved using the distributed semaphore, the amount of disk space required by the first job may be allocated to the first job. In step 622, the first job is run subsequent to allocating the amount of disk space required by the first job to the first job. The first job may be executed using a data storage node within a cluster of data storage nodes and the amount of disk space may be allocated from available disk space within the cluster of data storage nodes.

In some embodiments, in cases where the amount of disk space required by a first job cannot be reserved from a first semaphore or the initial semaphore for the first job, the remaining amount of disk space to be reserved for the first job may be allocated sequentially starting with semaphores of the distributed semaphore with the greatest amount of free disk space or the greatest amount of unreserved disk space after disk space reservation have been made to the initial semaphore.

Figure 6B:
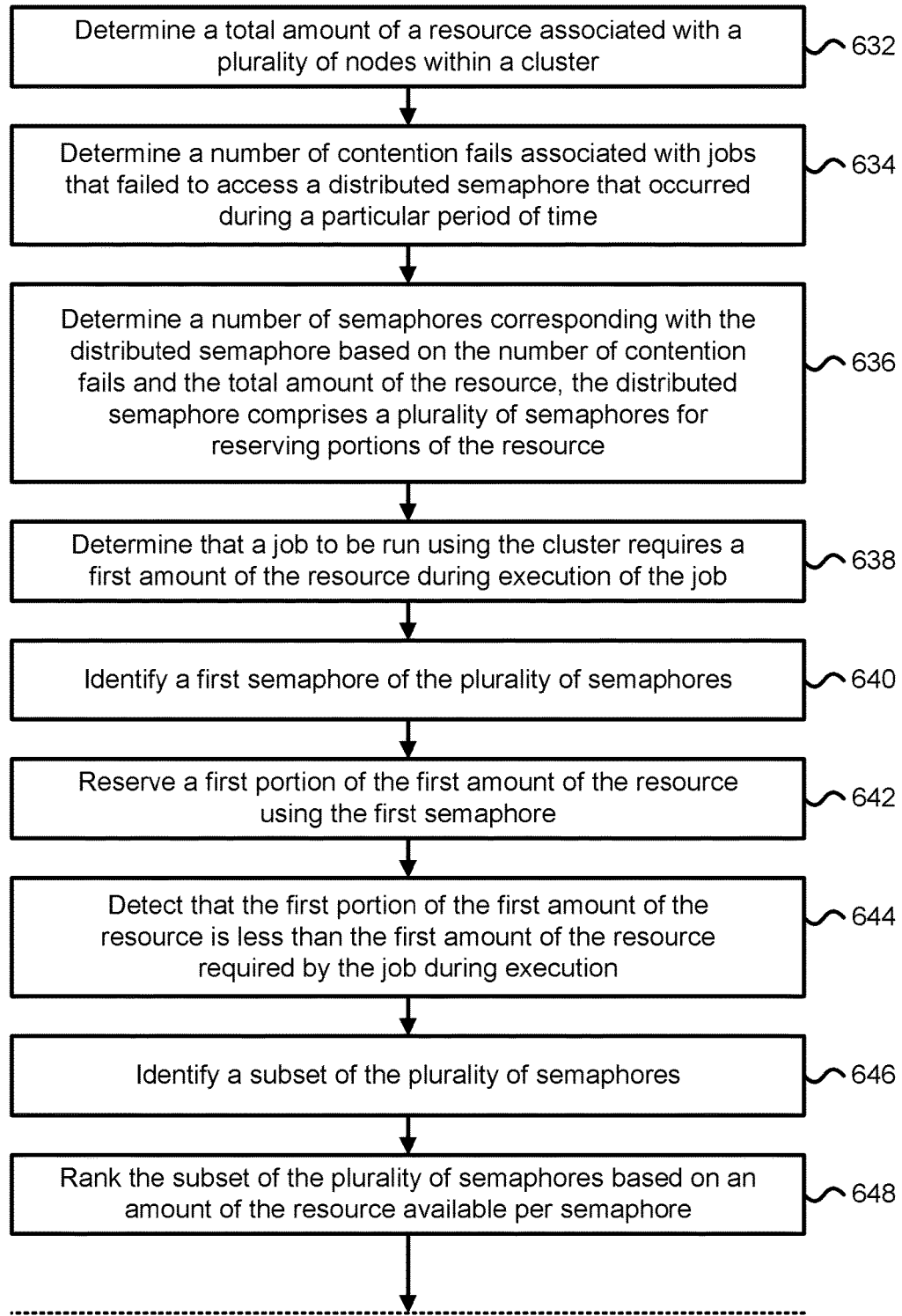
FIGS. 6B-6C depict a flowchart describing another embodiment of a process for allocating disk space using a distributed semaphore.
Figure 6C:
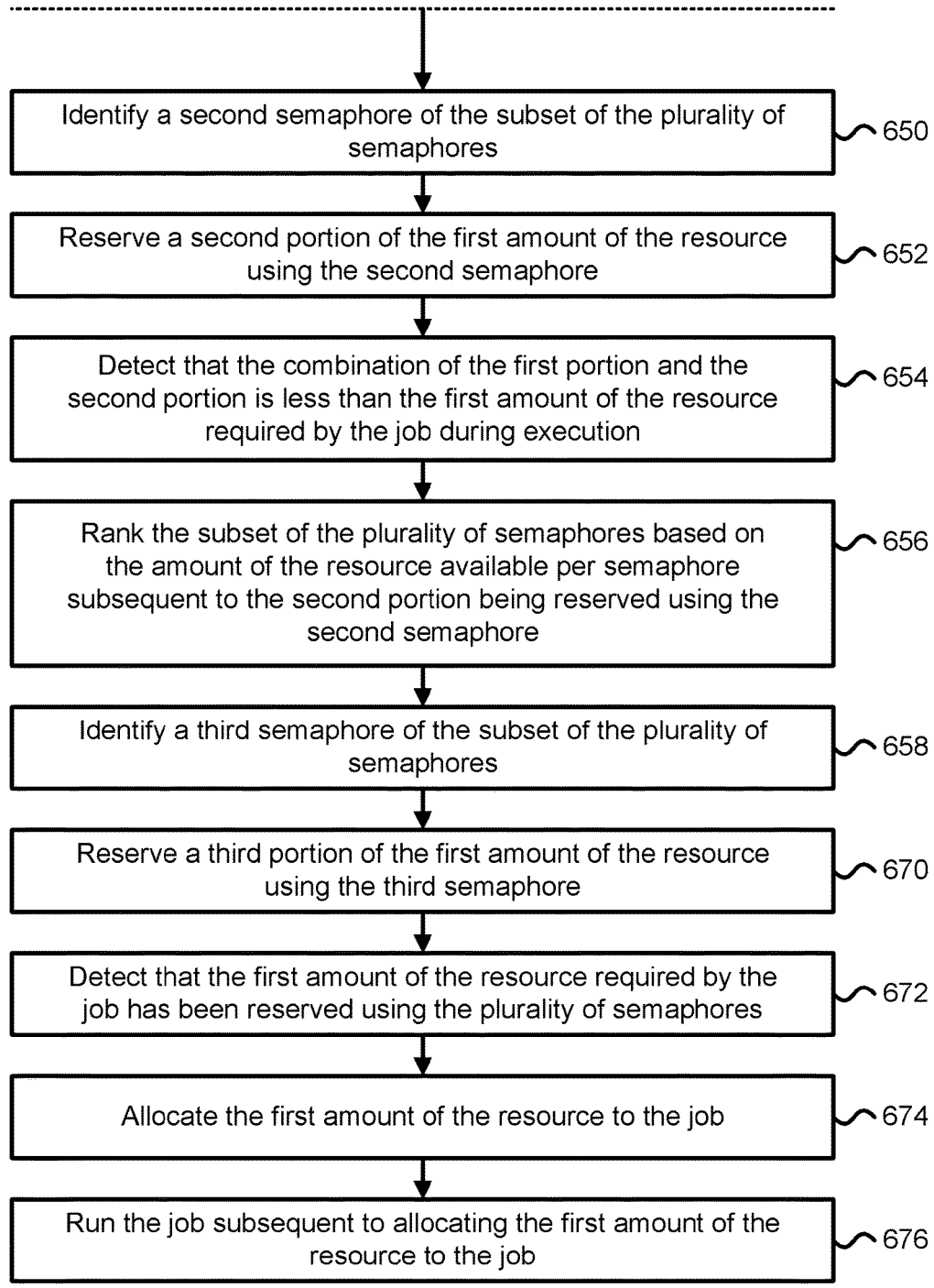

FIGS. 6B-6C depict a flowchart describing another embodiment of a process for allocating disk space using a distributed semaphore. In one embodiment, the process of FIGS. 6B-6C may be performed by a storage appliance, such as storage appliance 170 or storage appliance 140 in FIG. 1A. The process of FIGS. 6B-6C may be performed by a data storage node, such as node 141 in FIG. 1D.

In step 632, a total amount of a resource associated with a plurality of nodes within a cluster is determined. In some cases, the cluster may comprise a plurality of data storage nodes and the resource may correspond with the amount of disk space for the cluster. In other cases, the resource may correspond with a global network bandwidth allowance for the cluster. In step 634, a number of contention fails associated with jobs that failed to access a distributed semaphore that occurred during a particular period of time is determined. The particular period of time may comprise the past ten minutes. In step 636, a number of semaphores corresponding with the distributed semaphore is determined based on the number of contention fails and/or the total amount of the resource. The distributed semaphore may comprise a plurality of semaphores for reserving portions of the resource. In one example, the number of semaphores may be set such that the amount of the resource reservable by each of the semaphores is a fixed amount (e.g., each of the semaphores may correspond with 10 TBs of disk space or 10 Mbit/s of network bandwidth). In another example, the number of semaphores may be set such that the number of contention fails is less than a maximum threshold of contention fails (e.g., is less than 100 contention fails over a preceding ten minute period of time).

In step 638, it is determined that a job to be run using the cluster requires a first amount of the resource during execution of the job. In step 640, a first semaphore of the plurality of semaphores is identified. The first semaphore may be identified using an initial semaphore mapping or via a hash function that hashes a job identifier for the job to the first semaphore. In cases where the first semaphore is full or completely reserved, a variable tracking the number of full initial semaphores may be incremented. In step 642, a first portion of the first amount of the resource is reserved using the first semaphore. In step 644, it is detected that the first portion of the first amount of the resource is less than the first amount of the resource required by the job during execution.

In this case, the entire first amount of the resource may not be reserved using only the first semaphore. In step 646, a subset of the plurality of semaphores is identified. The subset may be identified by randomly selecting five of the plurality of semaphores or by identifying the five semaphores of the plurality of semaphores with the greatest number of unreserved chunks. In step 648, the subset of the plurality of semaphores is ranked based on an amount of the resource available per semaphore. In step 650, a second semaphore of the subset of the plurality of semaphores is identified. The second semaphore may comprise the semaphore of the subset with the greatest number of unreserved chunks or the greatest number of unreserved portions of the resource.

In step 652, a second portion of the first amount of the resource is reserved using the second semaphore. In step 654, it is detected that the combination of the first portion and the second portion is less than the first amount of the resource required by the job during execution. In step 656, the subset of the plurality of semaphores is ranked again based on the amount of the resource available per semaphore subsequent to the second portion being reserved using the second semaphore. In step 658, a third semaphore of the subset of the plurality of semaphores is identified. The third semaphore may comprise the semaphore of the subset with the greatest number of unreserved chunks or the greatest number of unreserved portions of the resource subsequent to performing step 656. In step 670, the third portion of the first amount of the resource is reserved using the third semaphore. In step 672, it is detected that the first amount of the resource required by the job has been reserved using the plurality of semaphores. In step 674, the first amount of the resource is allocated to the job. In step 676, the job is run subsequent allocating the first amount of the resource to the job. The job may be executed using a data storage node within the cluster and the job may store data (e.g., a captured snapshot of a virtual machine) using the first amount of the resource (e.g., using 48 TBs of disk space associated with one or more disks).

Figure 7A:
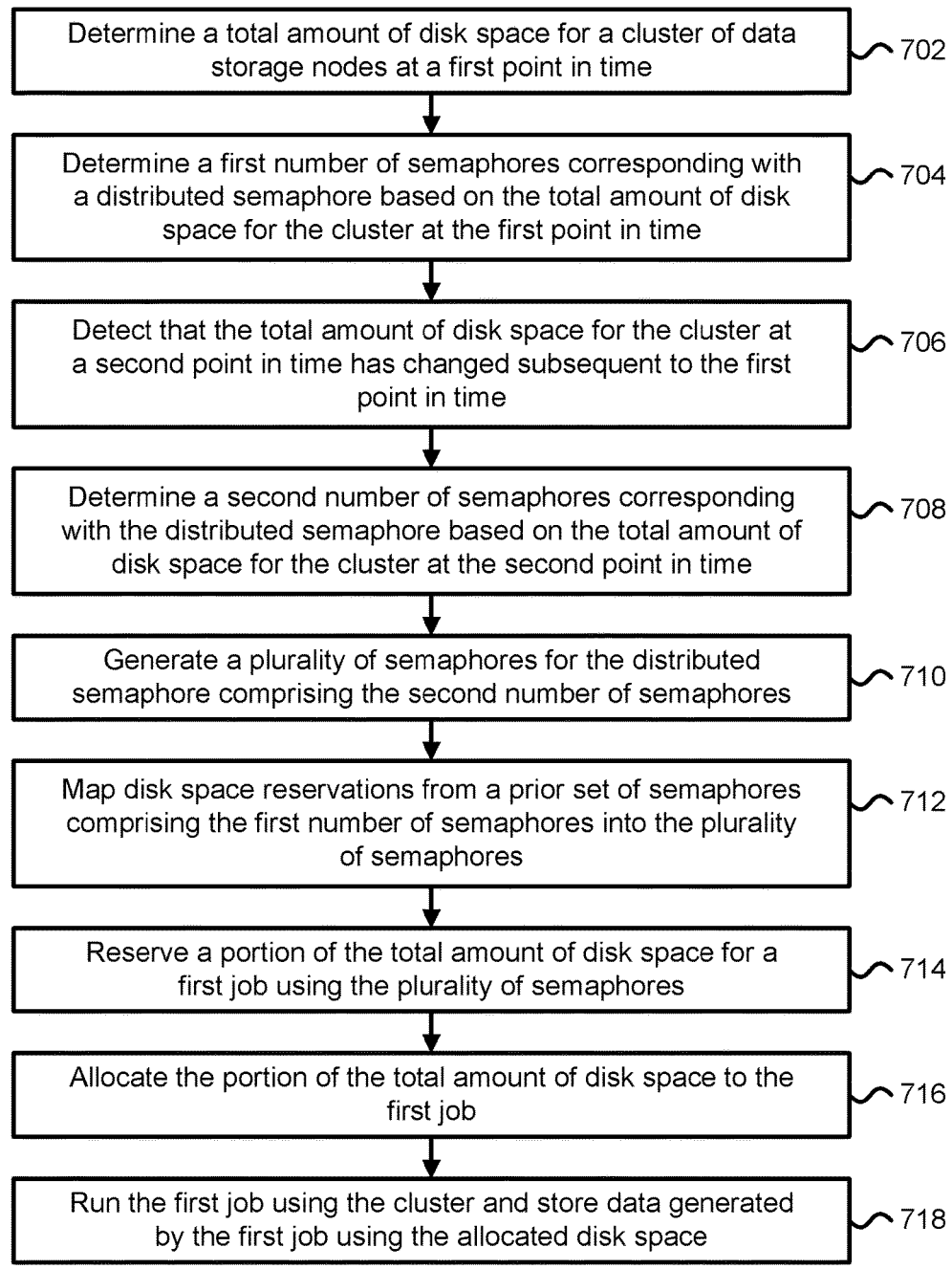
FIG. 7A is a flowchart describing one embodiment of a process for allocating disk space using a distributed semaphore.

FIG. 7A is a flowchart describing one embodiment of a process for allocating disk space using a distributed semaphore. In one embodiment, the process of FIG. 7A may be performed by a storage appliance, such as storage appliance 170 or storage appliance 140 in FIG. 1A. The process of FIG. 7A may be performed by a data storage node, such as node 141 in FIG. 1D.

In step 702, a total amount of disk space for a cluster of data storage nodes at a first point in time is determined. In one example, the total amount of disk space for the cluster at the first point in time may comprise 100 TBs of disk space. The disk space may include disk space from HDDs and/or SSDs. In step 704, a first number of semaphores corresponding with a distributed semaphore is determined based on the total amount of disk space for the cluster at the first point in time. In one example, the first number of semaphores may comprise ten semaphores and each of the ten semaphores may correspond with 10 TBs of disk space. In step 706, it is detected that the total amount of disk space for the cluster at a second point in time has changed subsequent to the first point in time. In one example, the total amount of disk space for the cluster may have increased due to the addition of a node to the cluster. In another example, the total amount of disk space for the cluster may have decreased due to a node failure or due to the removal of a node from the cluster. In step 708, a second number of semaphores corresponding with the distributed semaphore is determined based on the total amount of disk space for the cluster at the second point in time. In one example, the second number of semaphores may comprise twenty semaphores and each of the twenty semaphores may correspond with 10 TBs of disk space.

In step 710, a plurality of semaphores for the distributed semaphore comprising the second number of semaphores is generated. In one embodiment, the distributed semaphore with the second number of semaphores may be stored as a table with a number of rows corresponding with the second number of semaphores. The plurality of semaphores may be stored using a distributed key-value store. In step 712, disk space reservations are mapped from a prior set of semaphores comprising the first number of semaphores into the plurality of semaphores. In one example, the first number of semaphores may comprise three semaphores and the prior set of semaphores may correspond with the three semaphores 402-404 depicted in FIG. 4A. The second number of semaphores may comprise six semaphores and the plurality of semaphores may correspond with the six semaphores 422-427 depicted in FIG. 4D. In this case, each semaphore of the prior set of semaphores may be split into two semaphores. In one example, the first half of the first semaphore 402 in FIG. 4A may map to the semaphore 422 in FIG. 4D and the second half of the first semaphore 402 in FIG. 4A may map to the semaphore 423 in FIG. 4D. If the semaphore 402 in FIG. 4A has been marked as reserved, then both the semaphores 422-423 in FIG. 4D may be marked as reserved.

In step 714, a portion of the total amount of disk space for a first job is reserved using the plurality of semaphores. The portion of the total amount of disk space for the first job may comprise 50 TBs of disk space required by the first job during execution of the first job. In step 716, the portion of the total amount of disk space is allocated to the first job. In step 718, the first job is run using the cluster and data generated by the first job is stored using the allocated disk space. In one example, the first job may generate a full image snapshot of a virtual machine and store the full image snapshot of the virtual machine using the 50 TBs of disk space allocated to the first job.

Figure 7B:
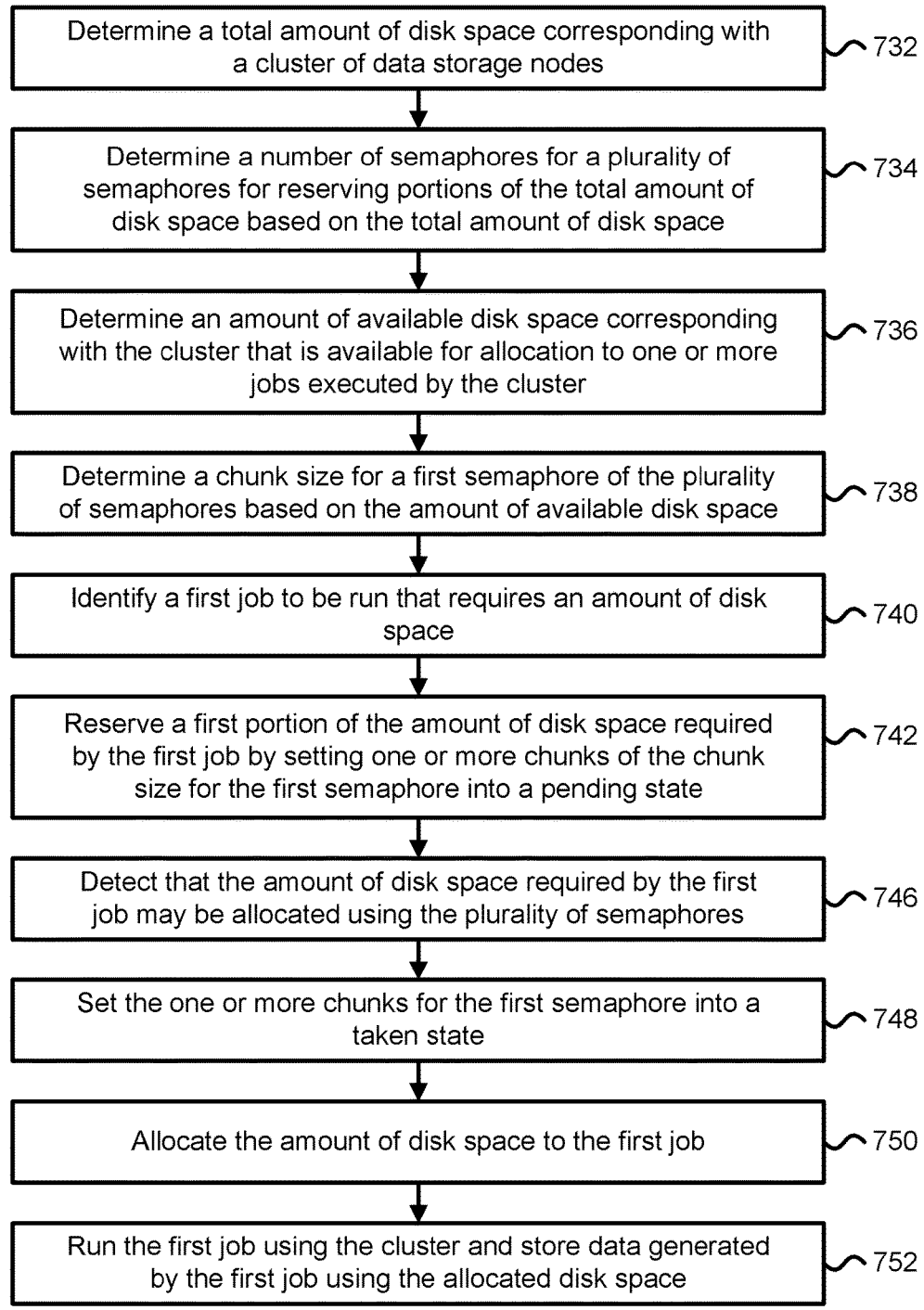
FIG. 7B is a flowchart describing another embodiment of a process for allocating disk space using a distributed semaphore.

FIG. 7B is a flowchart describing another embodiment of a process for allocating disk space using a distributed semaphore. In one embodiment, the process of FIG. 7B may be performed by a storage appliance, such as storage appliance 170 or storage appliance 140 in FIG. 1A. The process of FIG. 7B may be performed by a data storage node, such as node 141 in FIG. 1D.

In step 732, a total amount of disk space corresponding with a cluster of data storage nodes is determined. In step 734, a number of semaphores for a plurality of semaphores is determined based on the total amount of disk space. The plurality of semaphores may be used to reserve portions of the total amount of disk space. In one example, the number of semaphores may comprise the total amount of disk space within the cluster divided by 10 TBs of disk space per semaphore; in the case that the total amount of disk space within the cluster comprises 100 TBs of disk space, the number of semaphores may comprise ten semaphores. In step 736, an amount of available disk space corresponding with the cluster that is available for allocation to one or more jobs executed by the cluster is determined. In some cases, the amount of available disk space corresponding with the cluster may be determined from the unreserved portions of the plurality of semaphores.

In step 738, a chunk size for a first semaphore of the plurality of semaphores is determined based on the amount of available disk space. In one example, if the amount of available disk space for the cluster is above a threshold amount (e.g., is greater than 48 TBs of disk space), then the chunk size may be set to a first chunk size (e.g., 16 TB); however if the amount of available disk space is less than or equal to the threshold amount, then the chunk size may be set to a second chunk size (e.g., 8 TB) different from the first chunk size. The second chunk size may be less than the first chunk size.

In step 740, a first job to be run that requires an amount of disk space during execution of the first job is identified. In step 742, a first portion of the amount of disk space required by the first job is reserved by setting one or more chunks of the chunk size for the first semaphore into a pending state. In step 746, it is detected that the amount of disk space required by the first job may be allocated using the plurality of semaphores. In one example, it may be detected that the amount of disk space required by the first job may be allocated if a set of chunks within the plurality of semaphores have been set into a pending state or a pending allocation state and the disk space covered by the set of chunks is equal to or greater than the amount of disk space required by the first job. In step 748, the one or more chunks for the first semaphore are set into a taken state or a reserved state. In step 750, the amount of disk space is allocated to the first job. In step 752, the first job is run using the cluster and data generated by the first job is stored using the allocated disk space. In one example, the first job may generate a full image snapshot of a real machine and store the full image snapshot of the real machine using 24 TBs of disk space allocated to the first job. In another example, the first job may generate an incremental file associated with a snapshot of a virtual machine by consolidating two of more snapshots of the virtual machine and store the incremental file using the disk space allocated to the first job.

One embodiment of the disclosed technology includes identifying a first job to be executed using a node within a cluster, determining an amount of disk space to be allocated to the first job prior to the first job being executed using the node, identifying an initial semaphore of a plurality of semaphores for reserving disk space, reserving a first portion of the amount of disk space from the initial semaphore, detecting that the first portion of the amount of disk space is less than the amount of disk space to be allocated to the first job, identifying a subset of the plurality of semaphores in response to detecting that the first portion of the amount of disk space is less than the amount of disk space to be allocated to the first job, ranking the subset of the plurality of semaphores based on an amount of reservable disk space per semaphore, identifying a second semaphore of the subset of the plurality of semaphores based on the ranking of the subset, reserving a second portion of the amount of disk space from the second semaphore, detecting that the amount of disk space to be allocated to the first job has been reserved using the plurality of semaphores, allocating the amount of disk space to the first job, and executing the first job using the node subsequent to allocating the amount of disk space to the first job.

One embodiment of the disclosed technology includes determining that a first job to be run using a cluster of data storage nodes requires a first amount of a cluster resource during execution of the first job and identifying a first semaphore of a plurality of semaphores corresponding with a distributed semaphore. The plurality of semaphores comprises a first number of semaphores. The identifying the first semaphore includes identifying the first semaphore based on a job identifier for the first job modulo the first number of semaphores. The method further comprises reserving a first portion of the first amount of the cluster resource using the first semaphore, detecting that the first portion of the first amount the cluster resource is less than the first amount of the resource required by the first job during execution, identifying a subset of the plurality of semaphores, ranking the subset of the plurality of semaphores based on an amount of the cluster resource available for reservation per semaphore, identifying a second semaphore of the subset of the plurality of semaphores based on the ranking of the subset, reserving a second portion of the first amount of the cluster resource using the second semaphore, detecting that the first amount of the cluster resource required by the first job has been reserved using the plurality of semaphores, allocating the first amount of the cluster resource to the first job, running the first job using the cluster of data storage nodes subsequent to allocating the first amount of the cluster resource to the first job, and storing data generated by the first job using the cluster of data storage nodes.

One embodiment of the disclosed technology includes a memory (e.g., a volatile or non-volatile memory) in communication with one or more processors. The memory configured to store a plurality of semaphores corresponding with a distributed semaphore. The one or more processors configured to identify a first job to be executed using a node within a cluster. The first job requires an amount of disk space to be allocated to the first job. The one or more processors configured to identify an initial semaphore of the plurality of semaphores and reserve a first portion of the amount of disk space from the first semaphore. The one or more processors configured to detect that the first portion of the amount of disk space is less than the amount of disk space required by the first job and identify a subset of the plurality of semaphores. The one or more processors configured to rank the subset of the plurality of semaphores based on an amount of reservable disk space per semaphore and identify a second semaphore of the subset of the plurality of semaphores based on the ranking of the subset. The one or more processors configured to reserve a second portion of the amount of disk space from the second semaphore and detect that the amount of disk space required by the first job has been reserved using the distributed semaphore. The one or more processors configured to cause the amount of disk space required by the first job to be allocated to the first job and cause the first job to be executed on the node subsequent to allocation of the amount of disk space to the first job.

One embodiment of the disclosed technology includes determining a first amount of disk space for a cluster of data storage nodes at a first point in time, determining a first number of semaphores corresponding with a distributed semaphore based on the first amount of disk space for the cluster at the first point in time, determining a second amount of disk space for the cluster of data storage nodes at a second point in time subsequent to the first point in time, detecting that the second amount of disk space for the cluster of data storage nodes at the second point in time is different from the first amount of disk space for the cluster of data storage nodes at the first point in time, and determining a second number of semaphores different from the first number of semaphores corresponding with the distributed semaphore in response to detecting that the second amount of disk space for the cluster of data storage nodes at the second point in time is different from the first amount of disk space for the cluster of data storage nodes at the first point in time. The determining the second number of semaphores includes determining the second number of semaphores based on the second amount of disk space for the cluster at the second point in time. The method further comprises generating a plurality of semaphores comprising the second number of semaphores, mapping disk space reservations from a prior set of semaphores for the distributed semaphore comprising the first number of semaphores into the plurality of semaphores comprising the second number of semaphores, reserving a portion of the second amount of disk space for a first job using the plurality of semaphores, allocating the portion of the second amount of disk space to the first job, running the first job using the cluster subsequent to allocating the portion of the second amount of disk space to the first job, and storing data generated by the first job within the portion of the second amount of disk space allocated to the first job.

One embodiment of the disclosed technology includes determining a total amount of disk space for a cluster of data storage nodes at a first point in time, determining a first number of semaphores corresponding with a distributed semaphore based on the total amount of disk space for the cluster, storing a first plurality of semaphores for the distributed semaphore comprising the first number of semaphores, detecting that a number of contention fails associated with prior jobs that failed to access the distributed semaphore during a particular period of time subsequent to the first point in time has exceeded a threshold number of contention fails, determining a second number of semaphores greater than the first number of semaphores corresponding with the distributed semaphore subsequent to the first point in time in response to detecting that the number of contention fails during the particular period of time has exceeded the threshold number of contention fails, storing a second plurality of semaphores for the distributed semaphore comprising the second number of semaphores, mapping disk space reservations from the first plurality of semaphores to the second plurality of semaphores, reserving a portion of the total amount of disk space for a first job using the second plurality of semaphores, allocating the portion of the total amount of disk space to the first job, running the first job using the cluster subsequent to allocating the portion of the total amount of disk space to the first job, and storing data generated by the first job within the portion of the total amount of disk space allocated to the first job. In some cases, the first number of semaphores may comprise three semaphores, the second number of semaphores may comprise six semaphores, and the mapping of the disk space reservations from the first plurality of semaphores to the second plurality of semaphores may include mapping the first half of the first semaphore 402 in FIG. 4A to the semaphore 422 in FIG. 4D and the second half of the first semaphore 402 in FIG. 4A to the semaphore 423 in FIG. 4D.

One embodiment of the disclosed technology includes determining a total amount of disk space for a cluster of data storage nodes, determining a number of semaphores for a plurality of semaphores based on the total amount of disk space, determining an amount of available disk space for the cluster that is available for allocation, determining a chunk size for a first semaphore of the plurality of semaphores based on the amount of available disk space for the cluster, identifying a first job to be run using the cluster that requires a first amount of disk space, reserving a first portion of the first amount of disk space by setting one or more chunks of the chunk size within the first semaphore into a pending state, detecting that a plurality of chunks within the plurality of semaphores covering the first amount of disk space has been set into the pending state, setting the plurality of chunks within the plurality of semaphores into a reserved state in response to detecting that the plurality of chunks covering the first amount of disk space has been set into the pending state, allocating the first amount of disk space to the first job, running the first job using the cluster subsequent to allocating the first amount of disk space to the first job, and storing data generated by the first job using the first amount of disk space allocated to the first job.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
   determining a first amount of disk space for a cluster of data storage nodes at a first point in time;
   determining a first number of semaphores corresponding with a distributed semaphore based on the first amount of disk space for the cluster at the first point in time;
   determining a second amount of disk space for the cluster of data storage nodes at a second point in time subsequent to the first point in time;
   detecting that the second amount of disk space for the cluster of data storage nodes at the second point in time is different from the first amount of disk space for the cluster of data storage nodes at the first point in time;
   determining a second number of semaphores different from the first number of semaphores corresponding with the distributed semaphore in response to detecting that the second amount of disk space for the cluster of data storage nodes at the second point in time is different from the first amount of disk space for the cluster of data storage nodes at the first point in time, the determining the second number of semaphores includes determining the second number of semaphores based on the second amount of disk space for the cluster at the second point in time;
   generating a plurality of semaphores comprising the second number of semaphores;
   mapping disk space reservations from a prior set of semaphores for the distributed semaphore comprising the first number of semaphores into the plurality of semaphores comprising the second number of semaphores;
   reserving a portion of the second amount of disk space for a first job using the plurality of semaphores;
   allocating the portion of the second amount of disk space to the first job;
   running the first job using the cluster subsequent to allocating the portion of the second amount of disk space to the first job; and
   storing data generated by the first job within the portion of the second amount of disk space allocated to the first job.

2. The method of claim 1, wherein:
   the running the first job using the cluster causes a snapshot of a virtual machine to be stored within the portion of the second amount of disk space allocated to the first job.

3. The method of claim 1, wherein:
   the distributed semaphore is stored using a distributed key-value store.

4. The method of claim 1, further comprising:
   detecting that the second amount of disk space for the cluster of data storage nodes is greater than the first amount of disk space and determining the second number of semaphores in response to detecting that the second amount of disk space for the cluster of data storage nodes is greater than the first amount of disk space.

5. The method of claim 1, wherein:
   the second number of semaphores is greater than the first number of semaphores.

6. The method of claim 1, further comprising:
   detecting that a new data storage node has been added to the cluster; and
   the detecting that the second amount of disk space for the cluster of data storage nodes at the second point in time is different from the first amount of disk space for the cluster of data storage nodes at the first point in time is performed in response to detecting that the new data storage node has been added to the cluster.

7. The method of claim 1, further comprising:
   detecting that a data storage node has been removed from the cluster; and
   the detecting that the second amount of disk space for the cluster of data storage nodes at the second point in time is different from the first amount of disk space for the cluster of data storage nodes at the first point in time is performed in response to detecting that the data storage node has been removed from the cluster.

8. A method for operating a data management system, comprising:
   determining a total amount of disk space for a cluster of data storage nodes at a first point in time;
   determining a first number of semaphores corresponding with a distributed semaphore based on the total amount of disk space for the cluster;
   storing a first plurality of semaphores for the distributed semaphore comprising the first number of semaphores;
   detecting that a number of contention fails associated with prior jobs that failed to access the distributed semaphore during a particular period of time subsequent to the first point in time has exceeded a threshold number of contention fails;
   determining a second number of semaphores greater than the first number of semaphores corresponding with the distributed semaphore subsequent to the first point in time in response to detecting that the number of contention fails during the particular period of time has exceeded the threshold number of contention fails;
   storing a second plurality of semaphores for the distributed semaphore comprising the second number of semaphores;
   mapping disk space reservations from the first plurality of semaphores to the second plurality of semaphores;
   reserving a portion of the total amount of disk space for a first job using the second plurality of semaphores;
   allocating the portion of the total amount of disk space to the first job;
   running the first job using the cluster subsequent to allocating the portion of the total amount of disk space to the first job; and
   storing data generated by the first job within the portion of the total amount of disk space allocated to the first job.

9. The method of claim 8, wherein:
   the running the first job using the cluster causes a snapshot of a virtual machine to be stored within the portion of the total amount of disk space allocated to the first job.

10. The method of claim 8, wherein:
    the detecting that the number of contention fails during the particular period of time has exceeded the threshold number of contention fails includes determining the number of contention fails due to the prior jobs failing to reserve disk space using the distributed semaphore during the particular period of time.

11. The method of claim 8, wherein:
    the distributed semaphore is stored using a distributed key-value store.

12. The method of claim 8, further comprising:
    detecting that a new data storage node has been added to the cluster; and increasing the number of semaphores for the distributed semaphore in response to detecting that the new data storage node has been added to the cluster.

13. The method of claim 8, further comprising:
detecting that a data storage node has been removed from the cluster; and
decreasing the number of semaphores for the distributed semaphore in response to detecting that the data storage node has been removed from the cluster.

14. The method of claim 8, wherein:
the reserving the portion of the total amount of disk space for the first job includes setting portions of the second semaphore into a pending state and then setting the portions of the second semaphore into a reserved state in response to detecting that the portion of the total amount of disk space required by the first job has been reserved using the second plurality of semaphores.

15. The method of claim 8, wherein:
the storing the second plurality of semaphores for the distributed semaphore includes storing a table with a number of rows corresponding with the second number of semaphores.

16. A method for operating a data management system, comprising:
determining a total amount of disk space for a cluster of data storage nodes;
determining a number of semaphores for a plurality of semaphores based on the total amount of disk space;
determining an amount of available disk space for the cluster that is available for allocation;
determining a chunk size for a first semaphore of the plurality of semaphores based on the amount of available disk space for the cluster;
identifying a first job to be run using the cluster that requires a first amount of disk space;
reserving a first portion of the first amount of disk space by setting one or more chunks of the chunk size within the first semaphore into a pending state;
detecting that a plurality of chunks within the plurality of semaphores covering the first amount of disk space has been set into the pending state;
setting the plurality of chunks within the plurality of semaphores into a reserved state in response to detecting that the plurality of chunks covering the first amount of disk space has been set into the pending state;
allocating the first amount of disk space to the first job;
running the first job using the cluster subsequent to allocating the first amount of disk space to the first job; and
storing data generated by the first job using the first amount of disk space allocated to the first job.

17. The method of claim 16, wherein:
the running the first job causes a snapshot of a virtual machine to be generated; and
the storing data generated by the first job includes storing the snapshot of the virtual machine within the first amount of disk space allocated to the first job.

18. The method of claim 16, wherein:
the determining the chunk size for the first semaphore includes increasing a previously set chunk size for the first semaphore.

19. The method of claim 16, further comprising:
determining a number of chunks within the first semaphore that are set into an unreserved state; and
the determining the chunk size for the first semaphore includes determining the chunk size based on the number of chunks within the first semaphore that are set into an unreserved state.

20. The method of claim 16, further comprising:
determining an amount of disk space remaining to be reserved by the first semaphore; and
the determining the chunk size for the first semaphore includes determining the chunk size based on the amount of disk space remaining to be reserved by the first semaphore.

* * * * *